United States Patent
Watanabe et al.

(10) Patent No.: US 9,645,701 B2
(45) Date of Patent: May 9, 2017

(54) ELECTRONIC APPARATUS, DISPLAY CONTROL SYSTEM, DISPLAY CONTROL METHOD, AND RECORDING MEDIUM FOR MANAGING A DISPLAY OF DISPLAY COMPONENTS OF APPLICATION PROGRAMS

(71) Applicants: Genki Watanabe, Kanagawa (JP); Rina Takahashi, Kanagawa (JP)

(72) Inventors: Genki Watanabe, Kanagawa (JP); Rina Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 345 days.

(21) Appl. No.: 14/089,966

(22) Filed: Nov. 26, 2013

(65) Prior Publication Data
US 2014/0149894 A1    May 29, 2014

(30) Foreign Application Priority Data
Nov. 28, 2012  (JP) ................................ 2012-259372
Nov. 25, 2013  (JP) ................................ 2013-242580

(51) Int. Cl.
*G06F 3/048*   (2013.01)
*G06F 3/0481*  (2013.01)
*G06F 3/12*    (2006.01)
*H04N 1/00*    (2006.01)

(52) U.S. Cl.
CPC .......... *G06F 3/0481* (2013.01); *G06F 3/1204* (2013.01); *G06F 3/1253* (2013.01); *G06F 3/1292* (2013.01); *H04N 1/00411* (2013.01); *H04N 1/00432* (2013.01); *H04N 1/00509* (2013.01)

(58) Field of Classification Search
CPC .. G06F 1/1696; G06F 3/04817; G06F 3/0482; G06F 3/04842
USPC ........................................................... 715/761
See application file for complete search history.

(56) References Cited

U.S. PATENT DOCUMENTS 7,913,168 B2*  3/2011  Hoshino ............... G06F 17/243
                                                         715/273
2007/0101297 A1  5/2007  Forstall et al.
(Continued)

FOREIGN PATENT DOCUMENTS

CN   102246140 A   11/2011
CN   102436335 A    5/2012
(Continued)

OTHER PUBLICATIONS

Chinese Office Action mailed on Jul. 5, 2016 for corresponding Chinese Application No. 201310632350.5.

*Primary Examiner* — Ajay Bhatia
*Assistant Examiner* — Phuong Nguyen
(74) *Attorney, Agent, or Firm* — Harness, Dickey & Pierce, P.L.C.

(57) ABSTRACT

An electronic apparatus, a display control system, a display control method, and a display control program stored on a recording medium, each of which determines one or more display components to be displayed together with an application user interface, using display size information, priority order information, and display condition information that are previously stored for each one of the display components.

17 Claims, 21 Drawing Sheets

(56) References Cited

U.S. PATENT DOCUMENTS

| | | | |
|---|---|---|---|
| 2007/0214409 A1* | 9/2007 | Miyata | G06F 3/1208 715/209 |
| 2008/0294983 A1 | 11/2008 | Hoshino et al. | |
| 2010/0146555 A1 | 6/2010 | Komsi | |
| 2012/0089939 A1 | 4/2012 | Pourshahid et al. | |
| 2013/0070282 A1 | 3/2013 | Takahashi | |
| 2013/0070298 A1 | 3/2013 | Watanabe | |
| 2013/0159841 A1* | 6/2013 | Yokoyama | H04N 1/00411 715/243 |

FOREIGN PATENT DOCUMENTS

| | | |
|---|---|---|
| CN | 102446093 A | 5/2012 |
| CN | 102722358 A | 10/2012 |
| JP | 2010-026808 | 2/2010 |

\* cited by examiner

FIG. 7A

| WIDGET | CURRENT PRIORITY SETTINGS | NUMBER OF DISPLAY FRAMES | DISPLAY CONDITIONS |
|---|---|---|---|
| TONER REMAINED | COPY: 1<br>SCANNER: NONE<br>PRINTER: 3 | 2 | NONE (ALWAYS)<br>TONER END<br>REMAINED 10% OR BELOW<br>REMAINED 20% OR BELOW |
| TIMER | COPY: 2<br>SCANNER: 2<br>PRINTER: 2 | 1 | NONE (ALWAYS)<br>EVERY ONE MIN. |
| PERIPHERAL DEVICE MANAGEMENT | COPY: 3<br>SCANNER: NONE<br>PRINTER: 5 | 2 | NONE (ALWAYS)<br>ERROR |
| HDD REMAINED MEMORY SPACE | COPY: 4<br>SCANNER: 1<br>PRINTER: NONE | 2 OR 1 | NONE (ALWAYS)<br>REMAINED 10% OR BELOW<br>REMAINED 20% OR BELOW |
| APPLICATION STATUS | COPY: 5<br>SCANNER: 5<br>PRINTER: 6 | 2 OR 1 | NONE (ALWAYS)<br>ERROR |
| NETWORK STATUS | COPY: 6<br>SCANNER: 3<br>PRINTER: 4 | 2 OR 1 | NONE (ALWAYS)<br>ERROR<br>SIGNAL (VERY WEAK)<br>SIGNAL (WEAK) |
| ECO STATUS | COPY: NONE<br>SCANNER: 4<br>PRINTER: 1 | 3 | NONE (ALWAYS)<br>REDUCTION RATE 10% OR BELOW<br>INITIAL LOGIN |

FIG. 7B

| SETTING CONDITION (AVAILABLE SETTING CONDITION) | OPERATION WHEN TOUCHED | DISPLAY ICON |
|---|---|---|
| AVAILABLE SETTING CONDITION: ALWAYS<br>AVAILABLE APPLICATION: APPLICATION USING PRINTER | JUMP TO SPECIFIED URL |  |
| AVAILABLE SETTING CONDITION: ALWAYS<br>AVAILABLE APPLICATION: ALL | ENLARGED DISPLAY |  |
| AVAILABLE SETTING CONDITION: CONNECTED WITH PERIPHERAL DEVICE<br>AVAILABLE APPLICATION: APPLICATION USING PERIPHERAL DEVICE | TRANSITION TO DETAILED SCREEN |  |
| AVAILABLE SETTING CONDITION: HDD MOUNTED<br>AVAILABLE APPLICATION: APPLICATION USING HDD | TRANSITION TO DETAILED SCREEN |  |
| AVAILABLE SETTING CONDITION: ALWAYS<br>AVAILABLE APPLICATION: ALL | TRANSITION TO ERROR DETECTED APPLICATION SCREEN, TRANSITION TO DETAILED SCREEN WHEN NO ERROR DETECTED |  |
| AVAILABLE SETTING CONDITION: CONNECTED TO NETWORK<br>AVAILABLE APPLICATION: APPLICATION USING NETWORK | TRANSITION TO DETAILED SCREEN |  |
| AVAILABLE SETTING CONDITION: ALWAYS<br>AVAILABLE APPLICATION: ALL | TRANSITION TO DETAILED SCREEN |  |

FIG. 8A

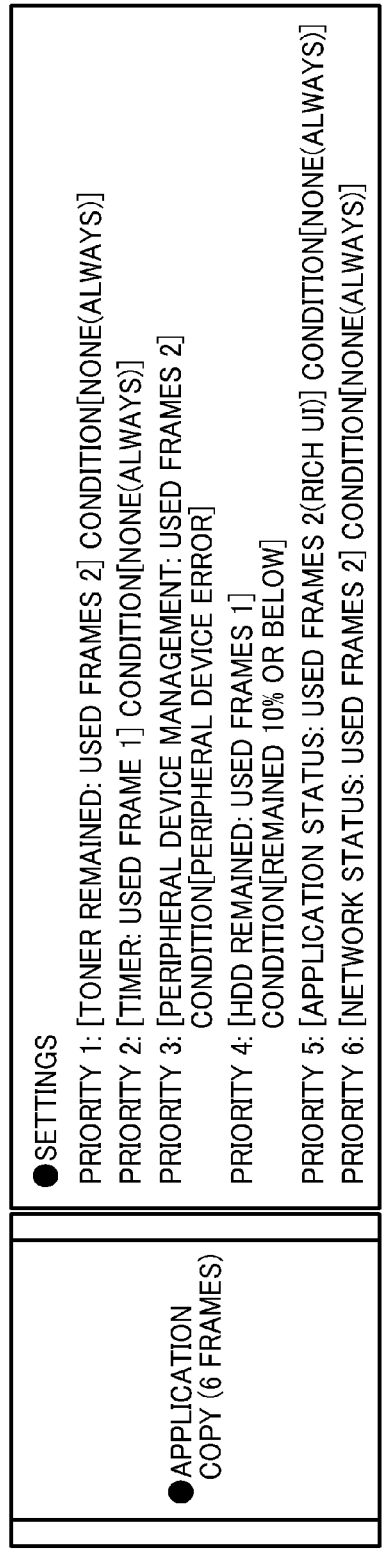

●APPLICATION COPY (6 FRAMES)

●SETTINGS
PRIORITY 1: [TONER REMAINED: USED FRAMES 2] CONDITION[NONE(ALWAYS)]
PRIORITY 2: [TIMER: USED FRAME 1] CONDITION[NONE(ALWAYS)]
PRIORITY 3: [PERIPHERAL DEVICE MANAGEMENT: USED FRAMES 2] CONDITION[PERIPHERAL DEVICE ERROR]
PRIORITY 4: [HDD REMAINED: USED FRAMES 1] CONDITION[REMAINED 10% OR BELOW]
PRIORITY 5: [APPLICATION STATUS: USED FRAMES 2(RICH UI)] CONDITION[NONE(ALWAYS)]
PRIORITY 6: [NETWORK STATUS: USED FRAMES 2] CONDITION[NONE(ALWAYS)]

FIG. 8B

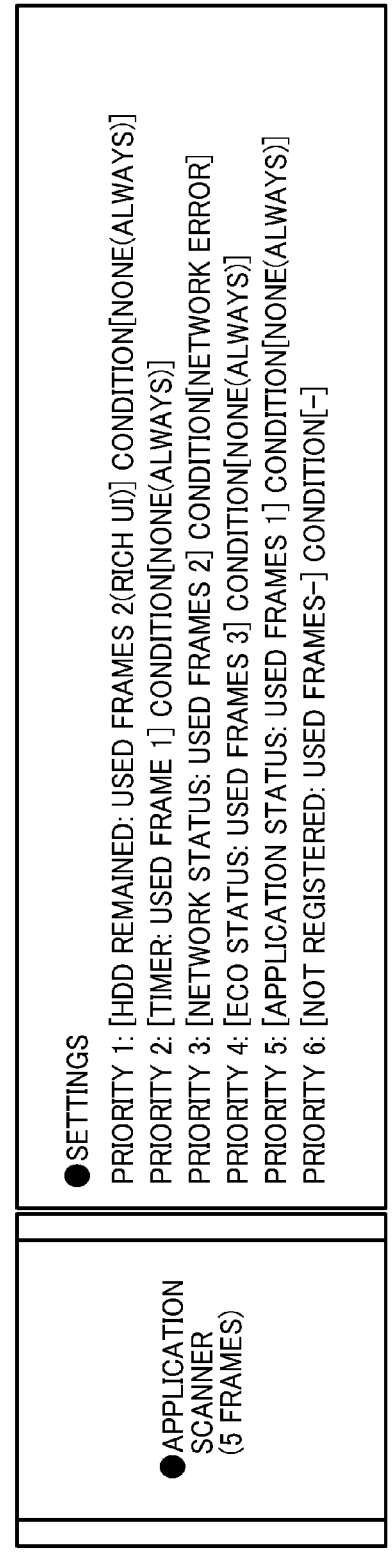

●APPLICATION SCANNER (5 FRAMES)

●SETTINGS
PRIORITY 1: [HDD REMAINED: USED FRAMES 2(RICH UI)] CONDITION[NONE(ALWAYS)]
PRIORITY 2: [TIMER: USED FRAME 1] CONDITION[NONE(ALWAYS)]
PRIORITY 3: [NETWORK STATUS: USED FRAMES 2] CONDITION[NETWORK ERROR]
PRIORITY 4: [ECO STATUS: USED FRAMES 3] CONDITION[NONE(ALWAYS)]
PRIORITY 5: [APPLICATION STATUS: USED FRAMES 1] CONDITION[NONE(ALWAYS)]
PRIORITY 6: [NOT REGISTERED: USED FRAMES-] CONDITION[-]

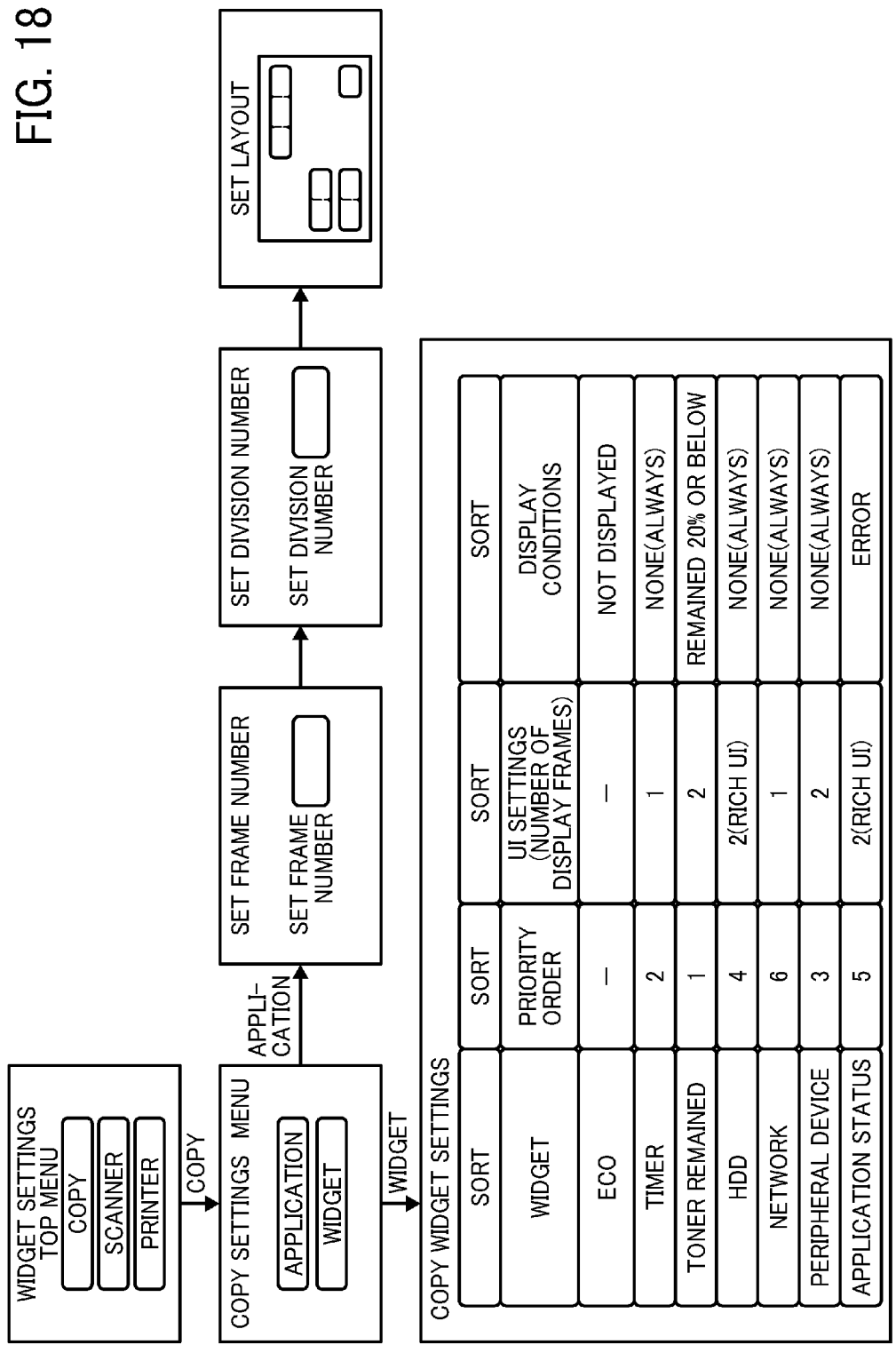

ELECTRONIC APPARATUS, DISPLAY CONTROL SYSTEM, DISPLAY CONTROL METHOD, AND RECORDING MEDIUM FOR MANAGING A DISPLAY OF DISPLAY COMPONENTS OF APPLICATION PROGRAMS

CROSS-REFERENCE TO RELATED APPLICATIONS

This patent application is based on and claims priority pursuant to 35 U.S.C. §119 to Japanese Patent Application Nos. 2012-259372, filed on Nov. 28, 2012, and 2013-242580, filed on Nov. 25, 2013, in the Japan Patent Office, the entire disclosure of which is hereby incorporated by reference herein.

BACKGROUND

Technical Field

The present invention generally relates to an electronic apparatus, a display control system, a display control method, and a display control program stored on a recording medium, each of which is capable of controlling display of information.

Description of the Related Art

Small application modules, which may be called widgets or gadgets, are widely used on desktops of personal computers. With the increase in number of widgets to be displayed on desktops, it becomes more cumbersome for a user to select a widget that provides services desired by the user.

SUMMARY

Example embodiments of the present invention include an electronic apparatus, a display control system, a display control method, and a display control program stored on a recording medium, each of which determines one or more display components to be displayed together with an application user interface, using display size information, priority order information, and display condition information that are previously stored for each one of the display components.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A and 7B ("FIG. 7") are an example data structure of a widget management table;

FIGS. 8A to 8C ("FIG. 8") are example data structures of application GUI settings management tables;

FIG. 18 is an illustration for explaining transition of screens to be displayed when setting application GUI.

Figure 1:
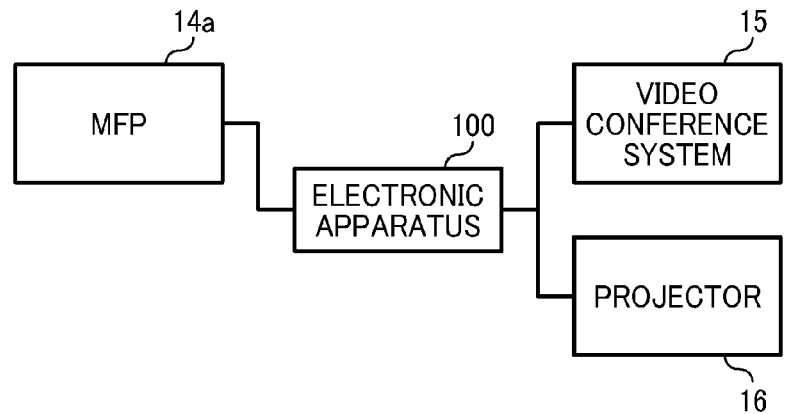
FIG. 1 is a configuration of a display control system including an electronic apparatus functioning as a display control apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 illustrates a configuration of a display control system according to an example embodiment of the present invention. The display control system of FIG. 1 includes an electronic apparatus 100 that functions as a display control apparatus, and one or more apparatuses connected through a network such as a wired or wireless network. In this example, the apparatuses subject for control by the electronic apparatus 100 include a multifunctional printer (MFP) 14a, a videoconference system 15, and a projector 16. The electronic apparatus 100 may be implemented by a smart phone or a tablet personal computer (PC). Through display control program installed onto the electronic apparatus 100, a user is able to control the MFP 14a, videoconference system 15, or projector 16. More specifically, using information displayed on a screen of the electronic apparatus 100, the user remotely operates the MFP 14a, videoconference system 15, or projector 16. For example, the electronic apparatus 100 controls display of information, according to selected function to be performed by the outside apparatus. The electronic apparatus 100 obtains information regarding an operation state of each apparatus based on a status signal received from the apparatus. Based on information regarding environments such as the operation state of the outside apparatus, the electronic apparatus 100 controls display of information according to the selected function to be performed by the outside apparatus.

Figure 2:
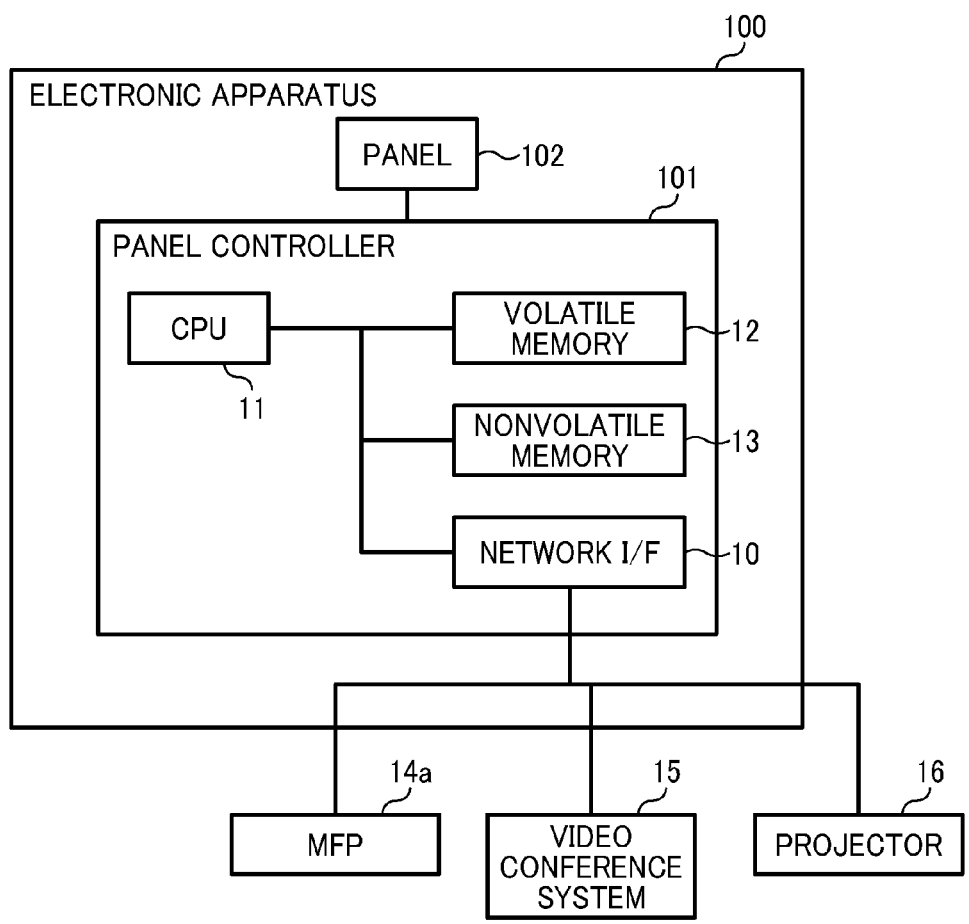
FIG. 2 is a schematic block diagram illustrating a hardware structure of a selected portion of the electronic apparatus of the display control system of FIG. 1, according to an example embodiment of the present invention.

FIG. 2 illustrates a hardware structure of a selected portion of the electronic apparatus 100 of FIG. 1. In this example, it is assumed that the electronic apparatus 100 is implemented by a smart phone with display control program. For descriptive purposes, a portion that relates to display control program will be described below. The electronic apparatus 100 mainly includes a panel controller 101 and a panel 102. The panel 102 may be implemented by any desired display including, for example, a liquid crystal display such as a touch panel of electrostatic type. The panel 102 functions as an input device that inputs a user instruction from the user, and an output device that outputs information to the user. In alternative to or in addition to the touch panel, the panel 102 may be implemented by one or more keys, as long as the panel 102 is able to receive a user input. Alternatively, the electronic apparatus 100, such as the smart phone 100, may use a microphone as an input device that receives a user input, that is, voices of a user. Alternatively, the electronic apparatus 100 may be connected to a removable input device such as a keyboard to receive a user input, or a removable output device such as a speaker.

The panel controller 101 includes a network interface (I/F) 10, a central processing unit (CPU) 11 that functions as a processor, a volatile memory 12 that functions as a primary storage area, and a nonvolatile memory 13 that functions as a secondary storage area. The network I/F 10 allows communication of data with the outside apparatus such as the MFP 14a, the videoconference system 15, or the projector 16. The volatile memory 12 functions as a work area of the CPU 11. The nonvolatile memory 13 stores various data, such as various programs and control data. The CPU 11 loads various programs stored on the nonvolatile memory 13 to perform processing. In this example, the CPU 11 loads display control program from the nonvolatile memory 13 onto the volatile memory 12 to perform display control.

While the example shown in FIGS. 1 and 2 illustrates the case in which the electronic apparatus 100 functioning as the display control apparatus remotely controls the outside apparatus using display control program, the display control apparatus may control its own devices using display control program.

Figure 3:
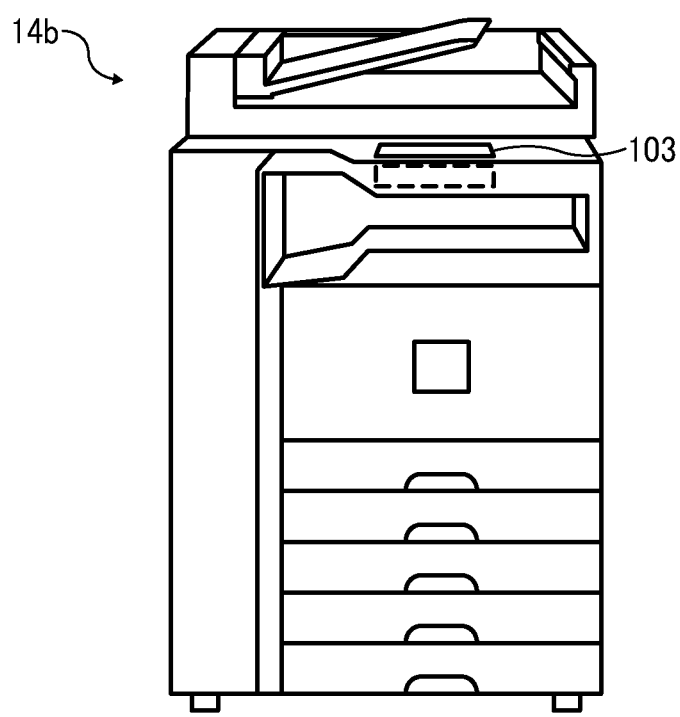
FIG. 3 is a configuration of an electronic apparatus functioning as a display control apparatus, according to an example embodiment of the present invention.

FIG. 3 illustrates a configuration of a display control apparatus according to an example embodiment of the present invention. In this example, the display control program is installed onto a MFP 14b, such that the MFP 14b is additionally provided with the function of display control. Using information displayed onto an operation panel 103 of the MFP 14b, the user at the MFP 14b operates various keys such as keys displayed on the operation panel 103 or hardware keys provided with the operation panel 103 to operate the MFP 14b. For example, the MFP 14b is installed with various application including scan application, printer application, and copy application. The MFP 14b controls display of information according to selected application.

Figure 4:
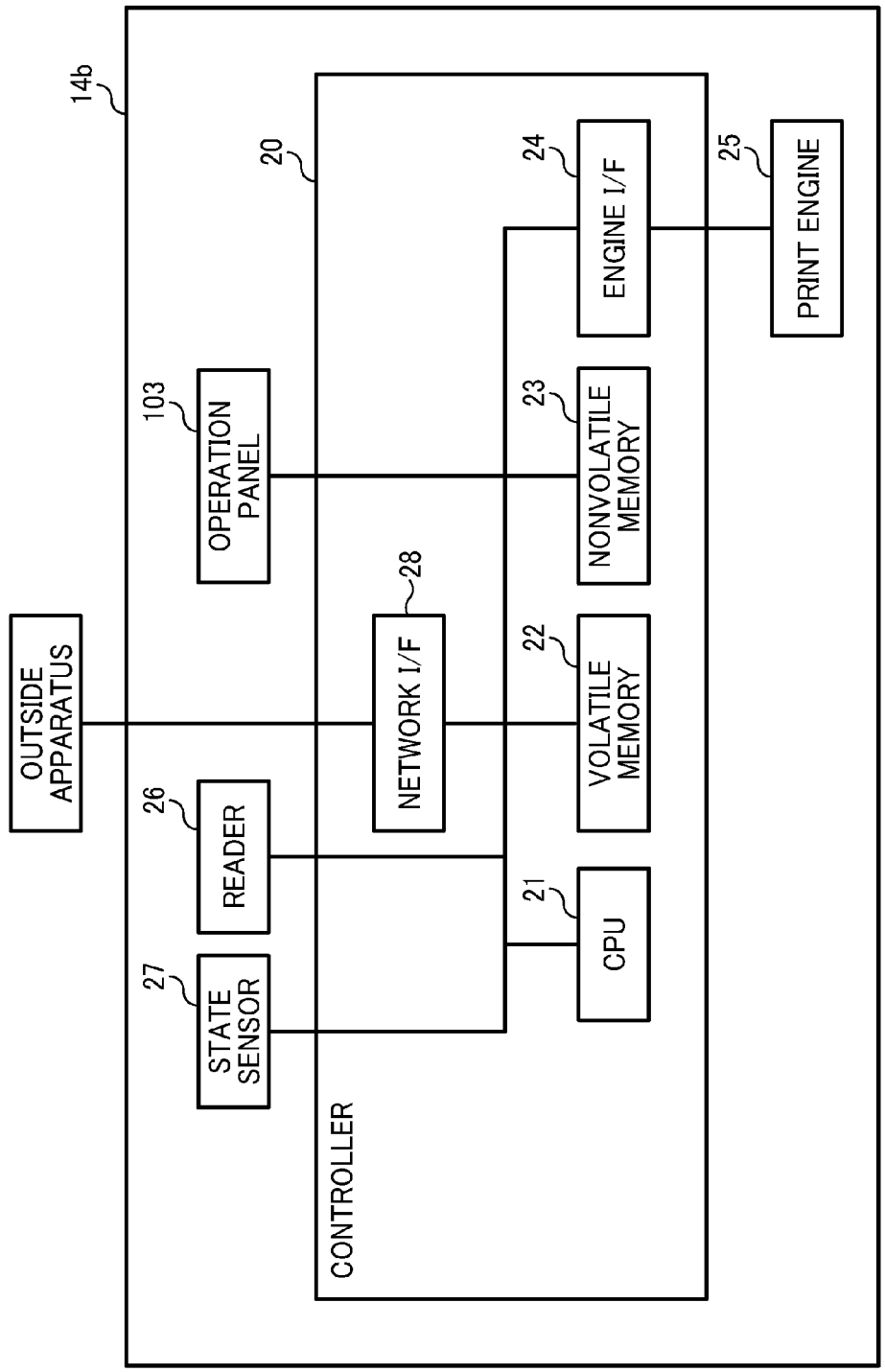
FIG. 4 is a schematic block diagram illustrating a hardware structure of a selected portion of the electronic apparatus of FIG. 3.

FIG. 4 illustrates a hardware structure of a selected portion of the MFP 14b of FIG. 3. The MFP 14b includes a controller 20, an operation panel 103, a reader 26, a state sensor 27, and a print engine 25.

The operation panel 103 functions as an input device that receives a user input, and an output device that displays various information. The print engine 25 prints an image on a recording sheet such as paper, for example, using devices related to image forming. The reader 26, which may be implemented by a scanner, reads an original image into image data. The image data generated at the reader 26 may be transmitted to the outside apparatus via a network I/F 28, or stored in a memory such as a volatile memory 22 or a nonvolatile memory 23. The state sensor 27 detects operation states of various devices in the MFP 14b, such as an operation state of a communication device or the print engine 25.

The controller 20 controls operation of the MFP 14b, and mainly includes a central processing unit (CPU) 21, the volatile memory 22, the nonvolatile memory 23, the network interface (I/F) 28, and an engine I/F 24. The network I/F 28 allows the MFP 14b to communicate with the outside apparatus through a network. The volatile memory 22 functions as a work area of the CPU 21. The nonvolatile memory 23 stores various data, such as various programs and control data. The engine I/F 24 allows communication with the print engine 25 such that the print engine 25 operates under control of the CPU 21. The CPU 21 loads various programs stored on the nonvolatile memory 23 to perform various processing. In this example, the CPU 21 loads display control program from the nonvolatile memory 23 onto the volatile memory 22 to perform display control. More specifically, in response to a user input from the operation panel 103, the CPU 21 causes the operation panel 103 to display various information, or controls various devices such as the print engine 25 or the reader 26.

In the following examples, the example case in which display of information is controlled using the electronic apparatus 100, such as the smart phone, as illustrated in FIGS. 1 and 2 are illustrated.

Figure 5:
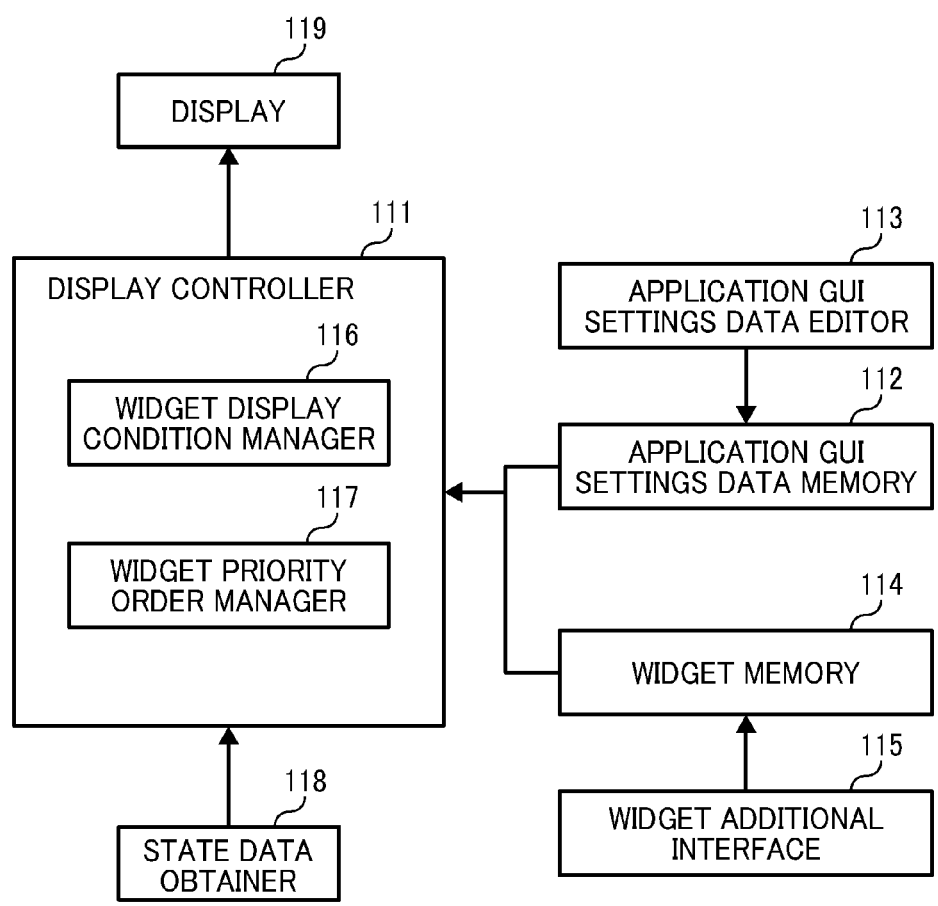
FIG. 5 is a schematic block diagram illustrating a functional structure of a panel controller of the electronic apparatus of FIG. 2, according to an example embodiment of the present invention.

FIG. 5 illustrates a functional structure of the electronic apparatus 100. The display control program is loaded onto a memory to realize the functional blocks of FIG. 5. For example, assuming that the electronic apparatus 100 has the display control program, the CPU 11 operates with the volatile memory 12 and the nonvolatile memory 13 to realize the functional blocks of FIG. 5. The panel controller 101 of FIG. 2 operates as a display controller 111, an application GUI settings data memory 112, an application GUI settings data editor 113, a widget memory 114, a widget additional interface 115, and a state data obtainer 118. The panel 102 operates as a display 119. The display controller 111 includes a plurality of modules, such as a widget display condition manager 116 and a widget priority order manager 117. Depending on how it is deigned, the display controller 111 may further include a widget size manager.

The display controller 111 controls display of information regarding widgets, such as one or more widgets to be displayed together with application GUI. For example, using the widget display condition manager 116 that manages the display condition of the widget, and the widget priority order manager 117 that manages a priority order of the widget, the display controller 111 controls one or more widgets to be displayed together with the application GUI, or appearances of the widgets to be displayed together with the application GUI. The display controller 111 may be implemented by a plurality of instructions to be performed by the CPU 11 that operates in cooperation with the memory.

The application GUI settings data memory 112 stores a plurality of application programs, and an application GUI settings data management table 1121 (FIG. 6) that stores GUI settings information for each application. The widget memory 114 stores a plurality of widgets, and a widget management table 1141 (FIG. 6) that stores information regarding each widget. The application GUI settings data memory 112 and the widget memory 114 may each be implemented by the volatile memory 112 or the nonvolatile memory 13.

The application GUI settings data editor 113 modifies information stored in the application GUI settings data memory 112, for example, according to the user preference reflected by a user input. The widget additional interface 115 modifies information stored in the widget management table 1141, for example, when a new widget is added. The application GUI settings data editor 113 and the widget additional interface 115 may each be implemented by a plurality of instructions to be performed b the CPU 11 that operates in cooperation with the memory.

The state data obtainer 118 obtains information regarding environments on which one of the application programs operates, such as state information regarding the application currently in use, or state information regarding one or more devices that operate under control of the application currently in use.

In one example, the state data obtainer 118 obtains operation states of various devices subject for display control by the electronic apparatus 100, such as the MFP 14a, the videoconference system 15, or the projector 16. In this example, the state data obtainer 118 may be implemented by the network I/F 10 of FIG. 2, which receives state information regarding the outside apparatus such as the MFP 14a, the videoconference system 15, and the projector 16. Based on the state information, which may be stored in any desired memory, the CPU 11 obtains information regarding the operation states of various devices.

In another example, the state data obtainer 118 may obtain operation states of peripheral devices provided for the outside apparatuses. Alternatively, the state data obtainer 18 may obtain operation states of its own devices. Alternatively, the state data obtainer 118 may obtain operation states of various application programs that may run on the outside apparatuses or on the electronic apparatus.

The display 119, which is implemented by the panel 102 of FIG. 2, displays various information under control of the display controller 111.

In this example illustrated in FIG. 5, the application GUI settings data editor 113, the application GUI settings data memory 112, the widget memory 114, and the widget additional interface 115 are all provided in the electronic apparatus 100. Alternatively, any one of the application GUI settings data editor 113, the application GUI settings data memory 112, the widget memory 114, and the widget additional interface 115 may be provided outside the electronic apparatus 100, such that any one of these elements may be provided in any desired apparatus including the MFP 14a, the videoconference system 15, or the projector 16. In such case, the display controller 111 may read the application or the widget, or information regarding the application or the widget, from the application GUI settings data memory 112 or the widget memory 114 provided on the outside apparatus through the network.

Figure 6:
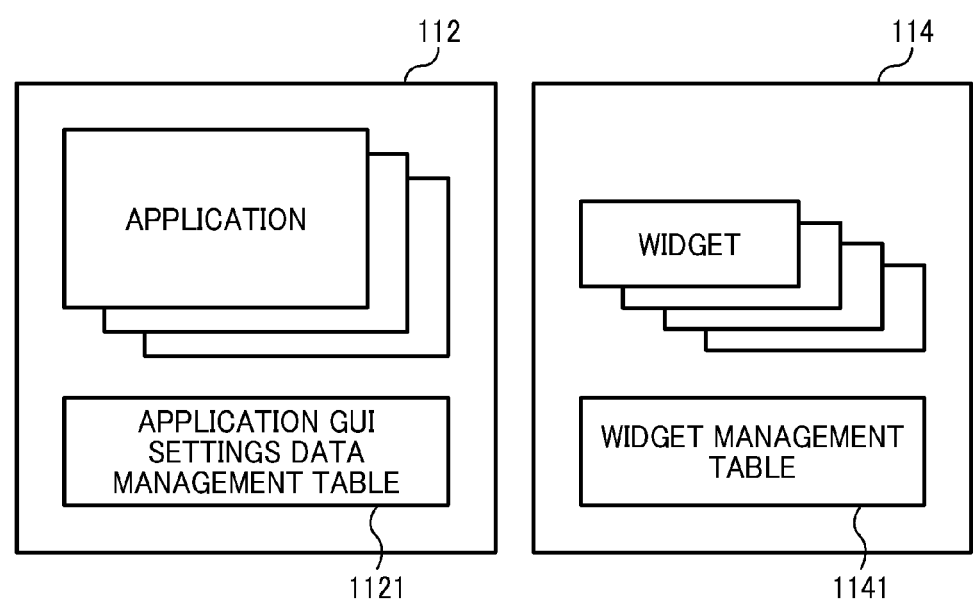
FIG. 6 is an illustration for explaining various data stored in the display control system of any one of FIGS. 1 and 3.

FIG. 6 illustrates various data, which is stored in a memory accessible by the electronic apparatus 100. The application GUI settings data memory 112 stores therein a plurality of application programs ("application"), each of which operates on the operating system (OS) of the electronic apparatus 100 or any outside apparatus subject for control by the electronic apparatus 100. In this example, it is assumed that the electronic apparatus 100 is installed with copy application that executes copy operation, scanner application that executes scan operation, and print application that executes print operation.

The widget memory 114 stores therein a plurality of widgets, each of which is small application that provides relevant information to the user. In this example, the widget provides a reporting service such as reporting an operation state of a specific device or a network status. When a predetermined condition is satisfied, the widget provides a service of displaying the operation state of the device or the network status. For example, the widget may display such information on its own widget GUI, which may be displayed with an application GUI. Alternatively, the widget may display such information on a part of the application GUI. The widget may be alternatively referred to as a gadget.

Still referring to FIG. 6, the application GUI settings memory 112 further stores the application GUI settings data management table 1121. Using various data stored in the application GUI settings data management table 1121, screens of each application GUI are managed. The widget memory 114 further stores the widget management table 1141. Using various data stored in the widget management table 1141, a display condition of each widget or operation to be executed according to user selection of each widget are managed.

FIG. 7 illustrates an example of the widget management table 1141. Referring to FIG. 7, the widget management table 1141 stores, for each widget, a priority order assigned to each widget for each application ("current priority settings"), a number of frames required for displaying each widget ("number of display frames"), a display condition under which each widget is to be displayed, criteria of application that can be associated with each widget ("setting condition"), operation being performed when each widget is selected ("operation when touched"), and one or more display icons reflecting each widget.

The current priority settings item stores information identifying specific application that is programmed to display each widget, and a priority order in displaying that widget for each application. For example, for the "toner remained" widget that reports the remained toner amount of the MFP 14a, the priority rate "1" is assigned to copy application, and the priority rate "3" is assigned to printer application. There is no priority rate assigned (or the priority rate "NONE" is assigned) to scanner application, such that the scanner application will not display the "toner remained" widget.

The number of display frames item stores information indicating the size of each widget, or a display area required for displaying each widget. In this example, one frame corresponds to the minimum area size of a widget icon to be displayed. For example, for the "toner remained" widget, two frames are needed to display the widget icon. Alternatively, the size of frame may be determined using any information capable of specifying the size of widget icon and/or shape of widget icon. For example, information indicating a shape of icon such as rectangular or triangular shape, or information indicating an area size of icon may be used. Using such information, an area needed for displaying the widget icon can be determined.

The display conditions item stores information regarding a condition or a criterion to be satisfied when displaying a specific widget icon. In this example, the condition or criterion to be satisfied can be any condition or criterion related to the environments on which a subject for display control is placed. For example, for the "toner remained" widget, the condition to display the icon of the "toner remained" widget can be selected from four conditions: "none(always)" that always displays the widget; "toner end" that displays the widget when toner of the MFP 14a is all consumed; "remained 10% or below" that displays the widget when the remained toner of the MFP 14a is equal to or below 10%; and "remained 20% or below" that displays the widget when the remained toner of the MFP 14a is equal to or below 20%.

The settings condition item stores information regarding a condition or criterion of application type that can display the widget icon ("available application"). For example, the type of application that can display the "toner remained" widget is application that executes print operation ("application using printer"). More specifically, the copy application that executes copy application (scan operation and print operation) and the printer application that executes print operation can display the "toner remained" widget. The scanner application that does not execute print operation is not able to display the "toner remained" widget.

The settings condition item further stores information regarding a condition or criterion of condition under which the widget can be displayed (available setting condition). For example, some widgets require existence of a specific device, such as a peripheral device being connected for the "peripheral device management" widget, and a HDD mounted on the electronic apparatus for the "HDD remained memory space" widget. Further, some widgets require existence of a specific condition, such as connection to a network for the "network status" widget.

The operation when touched item stores information regarding specific operation to be executed when the widget is selected by the user. For example, when the "toner remained" widget is selected by the user, a browser is executed to access a specified URL to display information related to the "toner remained" widget. In one example, the specified URL may display a screen showing the remained toner amount. In another example, the specified URL may display a screen that allows the user to order new supply. When the "timer" widget is selected, the displayed "timer" widget icon is enlarged in size, so that the user is able to easily check the time.

The display icon item stores an image of widget icon to be displayed for each widget. In case the size of icon is selectable, a plurality of widget icon images may be stored, respectively, for a plurality of sizes. For example, in case of the "HDD remained memory space" widget, two widget icons having different sizes are stored.

In addition to the widgets illustrated in FIG. 7, any other widget may be managed for use by the electronic apparatus 100. For example, the widget for indicating an error state of a device subject for control, such as any device in the MFP 14a, may be managed for use so as to report a trouble in electrical circuit or leakage of electricity, a mechanical trouble such as jam or degradation of a part, etc. In another example, the widget for indicating an operation state of a specific device in the MFP 14a may be managed for use. In another example, a widget for displaying a notice including advisement may be managed for use.

Figure 8C:
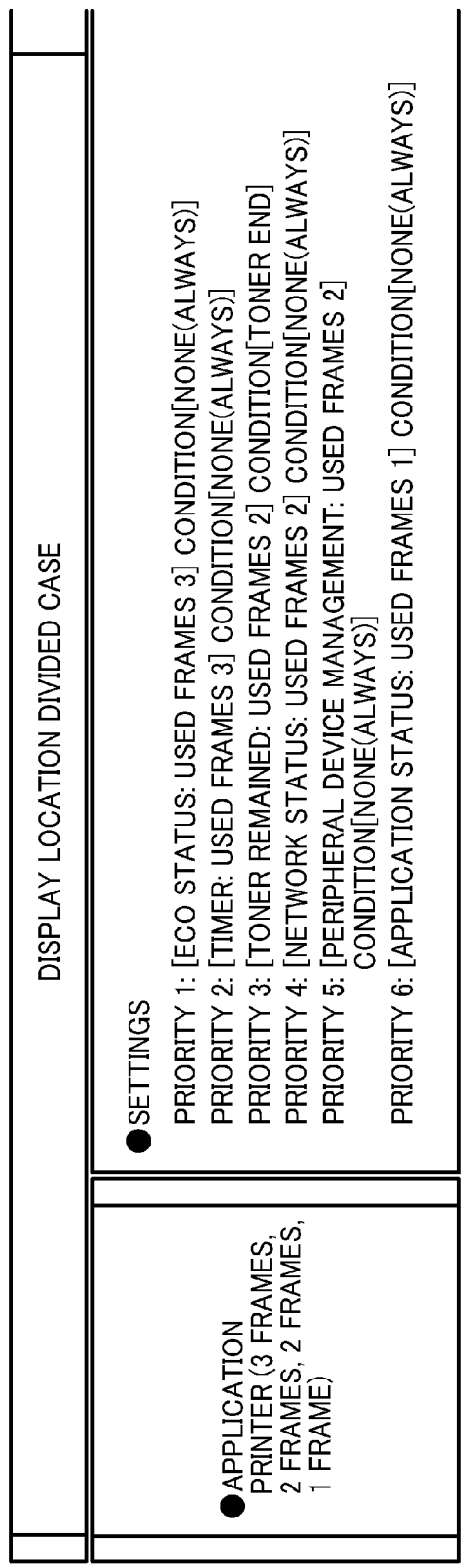

FIGS. 8A to 8C illustrate an example of the application GUI settings data management table 1121. FIG. 8A illustrates an entry of the management table 1121 for copy application. FIG. 8B illustrates an entry of the management table 1121 for scanner application. FIG. 8C illustrates an entry of the management table 1121 for printer application. Referring to FIGS. 8A to 8C, the number of total frames that can be displayed on the application GUI is previously set for each application. Further, for each application, a number of display frames ("used frames") and the display condition ("condition") are stored in association for each widget to be displayed by the GUI. Each widget that is set to be displayed for each application is assigned with the priority order, which may differ depending on the application.

More specifically, the widget that can be displayed by each application is set with the number of display frames (used frames), and the display condition. For example, for the "toner remained" widget having the priority rate "1" for the copy application, the number of used frames is "2" and the display condition is "none (always)". The "toner remained" widget will be always displayed with the copy application GUI, as the icon having 2 frame size. As illustrated in FIG. 7A, the "network status" widget has 1 or 2 frames. For copy application, the "network status" widget will be displayed as the icon having 2 frame size.

Referring now to FIGS. 8 to 9, operation of determining the total number of frames that can be displayed on a screen is explained according to an example embodiment of the present invention.

The widget, which is a display component having the reporting function, displays various icons of widget as illustrated in FIG. 7 on the application GUI. With one frame being set based on the minimum size icon, each widget is programmed to be displayed as an icon having at least one or two frames. This size of widget, which corresponds to the number of display frames or used frames, can be expressed by "Nwidget". Each application is set with the total number of frames that can be displayed on the application GUI, which may be expressed as "Napp" as described above referring to the application GUI settings management table 1121 of FIG. 8.

Figure 9A:
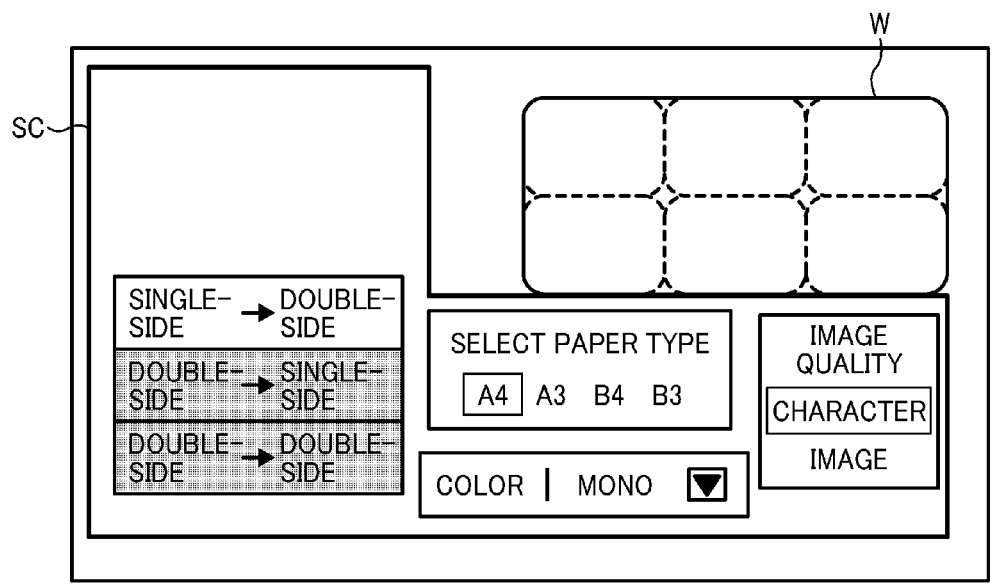
FIGS. 9A to 9C are illustration for explaining the layout of widgets for different applications.
Figure 9B:
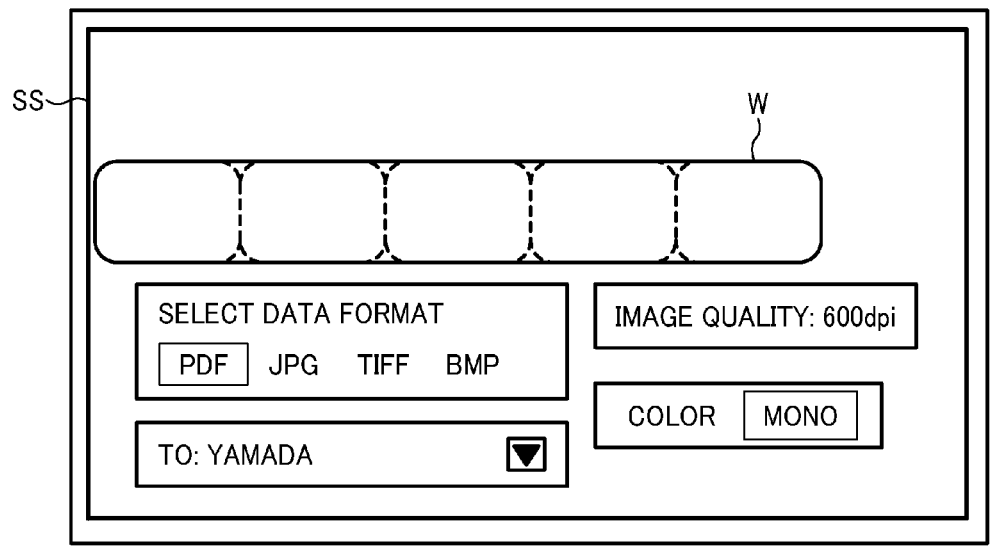
Figure 9C:
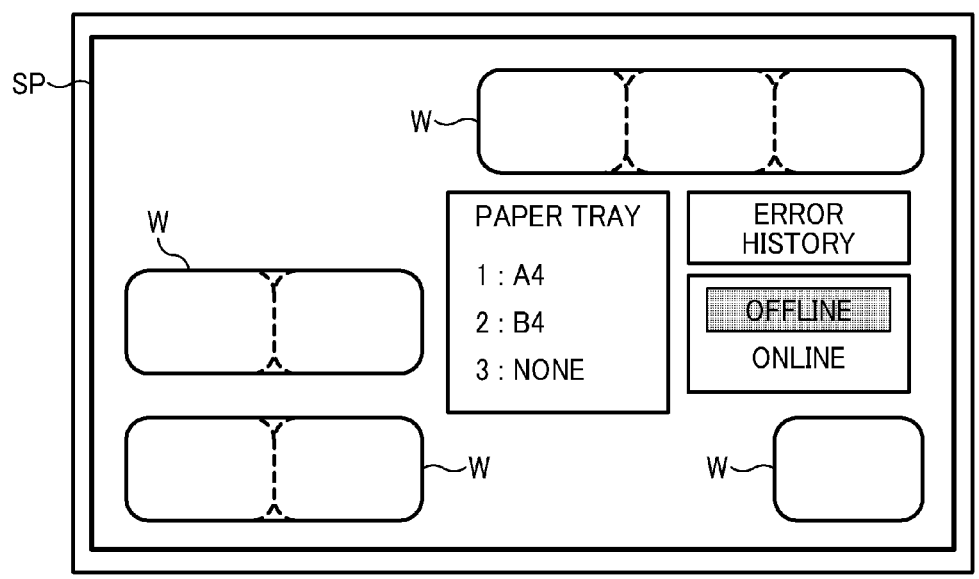

FIGS. 9A to 9C illustrate example screens each including a widget GUI, which is generated using the application GUI settings management table 1121 of FIG. 8. FIG. 9A illustrates an example screen of widget GUI, displayed together with copy application GUI SC. FIG. 9B illustrates an example screen of widget GUI displayed as a part of scanner application GUI SS. FIG. 9C illustrates an example screen widget GUI displayed as a part of printer application GUI SP.

Referring to FIG. 9A, the widget screen W is capable of displaying up to six frames, as the number of displayed frames "Napp" is set to six frames for copy application. Referring to FIG. 9B, the widget screen W is capable of displaying up to five frames, as the number of displayed frames "Napp" is set to five frames for scanner application. Referring to FIG. 9C, the widget screen W is capable of displaying up to eight frames, as the number of display frames "Napp" is set to eight frames for printer application. However, for printer application as illustrated in FIG. 9C, the frames of the widgets are displayed, while being divided into 3, 2, 3, and 1 frame for four screen areas.

As illustrated in FIG. 9A, the copy application GUI screen SC displays various options related to copy application, including an option regarding double-sided/single-sided printing, paper type selection, color type selection, and image quality selection. The electronic apparatus 100 may receive a user input, which selects one or more of the options being displayed. When the user input is received, the electronic apparatus 100 may display the selected option differently than the unselected options. For example, the unselected options may be displayed in dark color, while the selected option may be displayed in light color, as in the case of "single-sided/double-sided" option. In another example, as in the case of paper type selection, the selected option A4 may be indicated by a borderline. Further, as in the case of color type selection, the option may be selected using the pull-down menu. In one example, the electronic apparatus 100 generates control data based on the user input, and instructs the MFP 14a to perform copy operation based on the control data.

As illustrated in FIG. 9B, the scanner application GUI screen SS displays various options related to scanner application, including data format selection, setting of a destination address, color type selection, and image quality selection. The electronic apparatus 100 may receive a user input, which selects one or more of the options being displayed. When the user input is received, the electronic apparatus 100 may display the selection option differently than the unselected options. In one example, the electronic apparatus 100 generates control data based on the user input, and instructs the MFP 14a to perform scan operation based on the control data.

As illustrated in FIG. 9C, the printer application GUI screen SP displays various options related to printer application, including paper tray selection, option to display an error history, and online/offline selection. The electronic apparatus 100 may receive a user input, which selects one or more of the options being displayed. When the user input is received, the electronic apparatus 100 may display the selection option differently than the unselected options. In one example, the electronic apparatus 100 generates control data based on the user input, and instructs the MFP 14a to perform print operation based on the control data.

In any one of the above-described example screens of FIGS. 9A to 9C, an execution key may be displayed on the application GUI screen. When the execution key is selected by the user, the electronic apparatus 100 instructs the MFP 14a to perform processing based on control data that reflects settings selected by the user. For example, the copy application GUI SP of FIG. 9C may display the execution key. When the execution key is selected, the electronic apparatus 100 instructs the MFP 14a to perform copy operation based on settings selected by the user.

As described above, the widget GUI screen and the application GUI screen may be combined into one screen. More specifically, the display controller 111 generates a widget GUI image for display on a widget display area, and an application GUI image for display on an application display area. These images are combined together to be displayed onto one screen. For the copy application GUI of FIG. 9A, the application GUI image and the widget GUI image are displayed, as separate from each other.

Alternatively, the widget GUI image may be displayed, so as to be superimposed on the application GUI image. For the scanner application GUI of FIG. 9B, the widget GUI image is displayed so as to be superimposed on the application GUI image. When superimposing, the widget GUI image may be made in transparent.

With the change in size of display area for widget, the size of display area for application may need to change, for example, in case of displaying the application GUI image and the widget GUI image separately in FIG. 9A. In such case, the size of the application GUI image may be enlarged, so as to match the enlarged size of the widget GUI image. Alternatively, the size of a settings screen may be enlarged or reduced, with the enlarged or reduced size of the application GUI image. Alternatively, the items to be displayed on the settings screen may be increased or decreased, with the enlarged or reduced size of the application GUI image.

Figure 10:
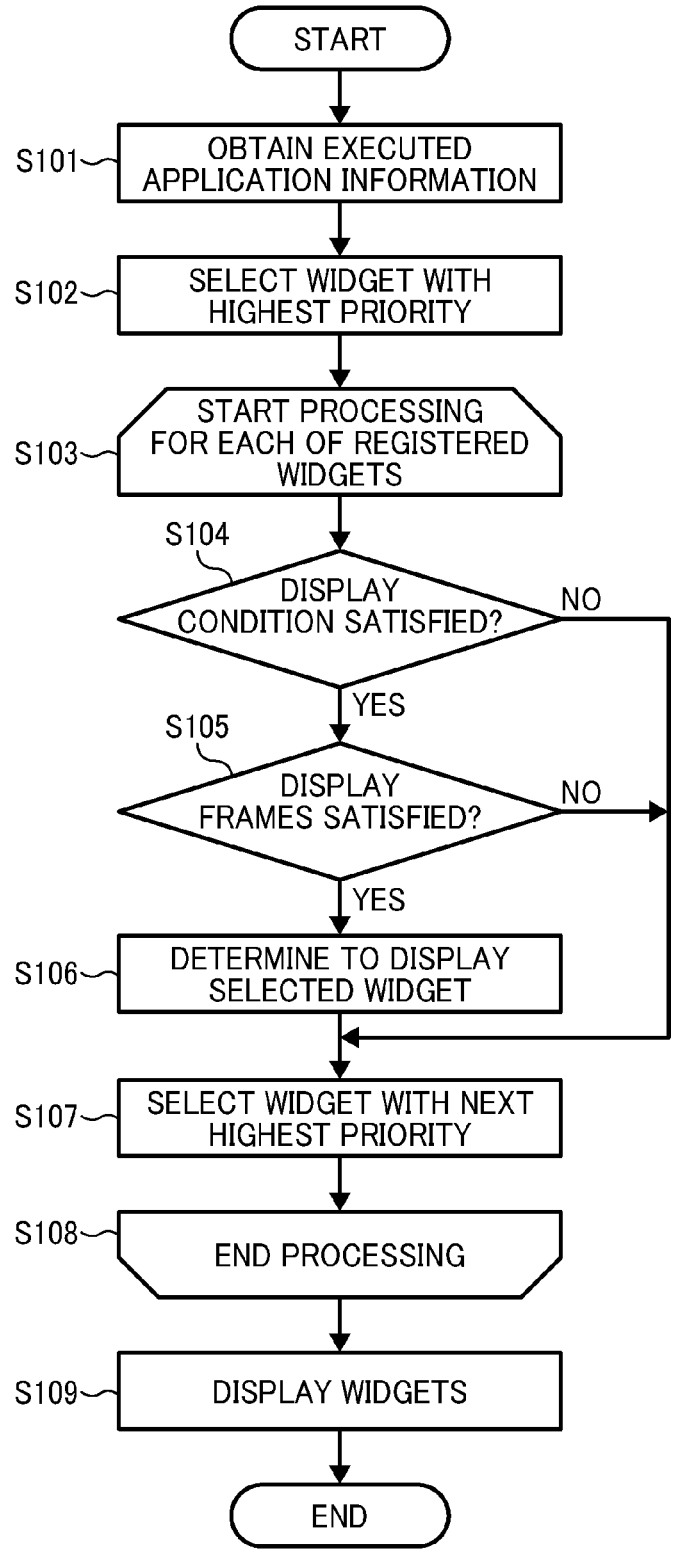
FIG. 10 is a flowchart illustrating operation of controlling display of an application GUI, performed by the electronic apparatus, according to an example embodiment of the present invention.

Referring now to FIG. 10, operation of controlling display of the widget GUI to be displayed together with the application GUI, performed by the electronic apparatus 100, is explained according to an example embodiment of the present invention.

On the electronic apparatus 100, each application is executed on background. When a GUI for a specific application is called, the display controller 111 starts generating a widget GUI for the specific application. For example, the display controller 111 identifies a specific application that is currently in use, based on a user input that selects the specific application through a menu screen. In the following example, it is assumed that copy application is called.

At S101, the display controller 111 obtains information regarding the application GUI settings, from the application GUI settings data memory 112, for copy application.

At S102, the display controller 111 selects a widget assigned with the highest priority rate, based on the information obtained at S101, as a target for determining whether to display the widget. More specifically, referring to FIG. 8A, the widget with the highest priority rate is the "toner remained" widget.

At S103, the display controller 111 starts operation of determining whether to display the widget, for the target widget. This operation may be repeated until all widgets registered for the called application are checked.

At S104, the display controller 111 determines whether the display condition for the target widget is satisfied. In the example case of the "toner remained" widget, the display controller 111 refers to the display condition "none(always)" to determine that the display condition for displaying the "toner remained" widget is satisfied ("YES" at S104).

Alternatively, in case the display condition "toner end" is selected as the display condition for the "toner remained" widget, at S104, the state data obtainer 118 obtains state information indicating whether the MFP 14a outputs a status signal indicating toner end, from the MFP 14a. When the state information indicates the toner end state, the widget display condition manager 116 determines to display the toner remained widget ("YES" at S104). When the state information does not indicate the toner end state, the widget display condition manager 116 determines not to display the toner remained widget ("NO" at S104).

At S105, the display controller 111 determines whether the remained number of display frames available for use is equal to or greater than the number of display (used) frames that is needed to display the widget icon of the target widget. When it is determined that there is a sufficient number of display frames available for use, the display controller 111 determines to display the widget ("YES" at S105). When there is not enough number of display frames available for use, the display controller 111 determines not to display the widget ("NO" at S105).

When the display condition and the frame number condition are both satisfied, at S106, the display controller 111 determines to display the target widget.

At S107, the display controller 111 selects the widget having the priority rate that is next highest, as the target widget to check whether to display the target widget. The steps S104 and S105 are then repeated for the next selected widget.

When there is no more registered widget to analyze, the operation proceeds to S108 to end operation of determining whether to display the widget. For example, the display controller 111 determines whether operation of determining whether to display has been performed for the number of registered widgets, which are previously associated with each application. When operation is not performed for the number of registered widgets, the operation repeats S104 and S105. When operation is performed for the number of registered widgets, the operation ends to proceed to S109.

At S109, the display controller 111 generates the widget GUI including the widgets that are determined to be displayed, and causes the display 119 to display the widget GUI. More specifically, the widgets that satisfy the display condition and the frame number condition are displayed in an order defined by the priority order. For example, the display 119 displays the widget GUI screen of any one of FIGS. 11 to 13.

Figure 11A:
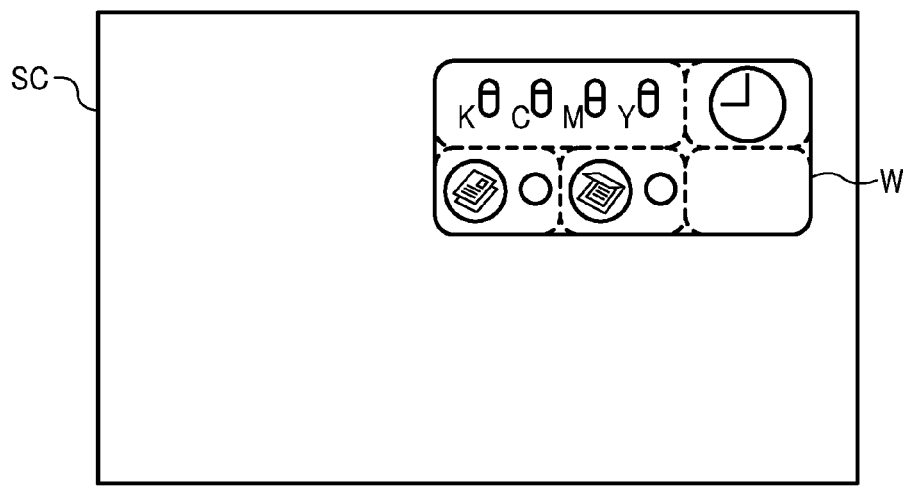
FIGS. 11A and 11B are illustration for explaining example GUI for copy application.
Figure 11B:
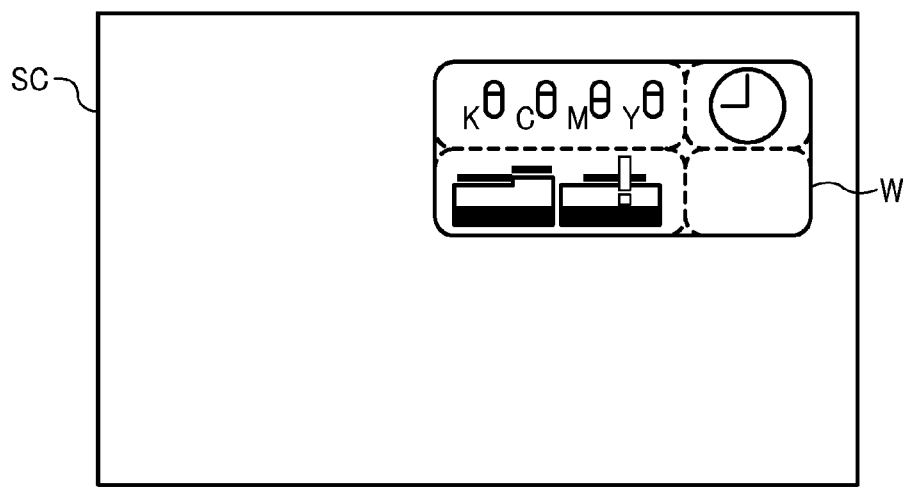

FIGS. 11A and 11B illustrate example screens of copy application GUI. In this example, the number of frames that can be displayed on the copy application GUI is 6. FIG. 11A illustrates a screen of copy application GUI when the MFP 14a normally operates. Referring back to FIG. 8A, the "toner remained" widget with the priority rate of 1, and the "timer" widget with the priority rate of 2 are both set with the display condition "none (always)". The toner remained" widget icon and the "timer" widget are always displayed on the copy application GUI. The "peripheral device management" widget with the priority rate of 3 is set with the display condition "peripheral device error", such that this widget icon is displayed only when there is a peripheral device error. When the MFP 14a normally operates, the "peripheral device management" icon is not displayed based on determination made at S104 of FIG. 10. The "HDD remained" widget with the priority rate of 4 is set with the display condition "HDD memory space 10% or below", such that this widget icon is not displayed when there is a sufficient HDD memory space. The "application status" widget with the priority rate of 5 is set with the display condition "none (always)", such that this widget icon is always displayed. The "network status" widget with the priority rate of 6 is set with the display condition "none (always)". However, the total number of frames that are used so far for the 2-frame "toner remained" widget, 1-frame "timer" widget, and 2-frame "application status" widget is 5. There is not sufficient space to display the 2-frame "network status" widget, so that this widget icon is not displayed based on determination made at S105 of FIG. 10.

The widget GUI for copy application when the MFP 14a normally operates is displayed as the screen illustrated in FIG. 11A, which includes the "toner remained" widget, "timer" widget, and "application status" widget.

FIG. 11B illustrates a screen of copy application GUI when an error is detected in peripheral device of the MFP 14a. The electronic apparatus 100 determines that an error is detected, based on state information received from the MFP 14a. When the error is detected in peripheral device, the display condition for displaying the "peripheral device management" widget with the priority rate of 3 is satisfied. Based on determination made at S104, the display controller 111 determines to display the "peripheral device management" widget. As described above referring to FIG. 11A, the display condition for the "HDD remained" widget with the priority rate of 4 is "HDD memory space 10% or below", such that this widget icon is not displayed when there is a sufficient HDD memory space based on determination made at S104. The "application status" widget with the priority rate of 5, and the "network status" widget with the priority rate of 6 are both set with the display condition "none (always)". However, the total number of frames that are used so far for the 2-frame "toner remained" widget, 1-frame "timer" widget, and 2-frame "peripheral device management" widget is 5. There is not sufficient space to display none of the 2-frame "application status" widget and the 2-frame "network status" widget, based on determination made at S105 of FIG. 10.

The widget GUI for copy application when an error is detected in peripheral device of the MFP 14a is displayed as the screen illustrated in FIG. 11B, which includes the "toner remained" widget, "timer" widget, and "peripheral device management" widget.

Figure 12A:
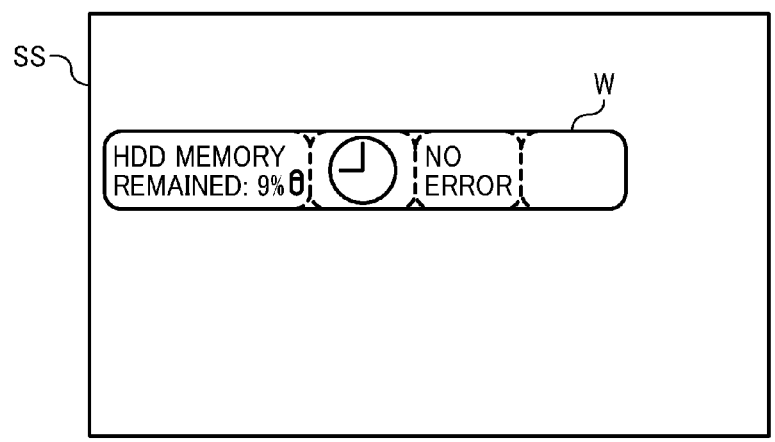
FIGS. 12A and 12B are illustration for explaining example GUI for scanner application.
Figure 12B:
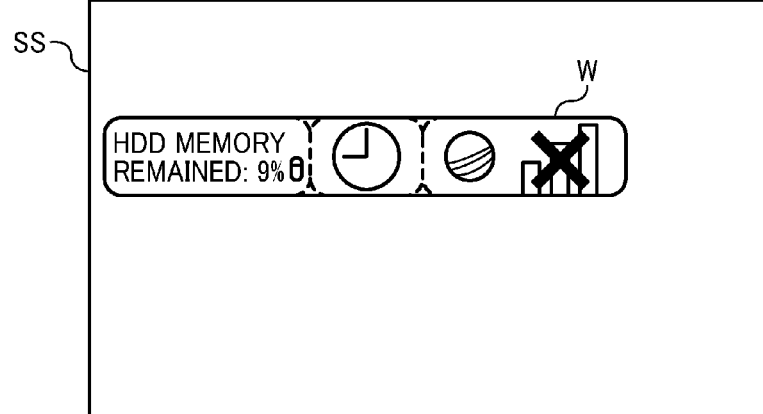

FIGS. 12A and 12B are example screens of scanner application GUI. More specifically, FIG. 12A illustrates a screen of scanner application GUI when the MFP 14a normally operates. Referring back to FIG. 8B, the "HDD remained" widget, the "timer" widget, and the "application status" widget are displayed, as they are set with the display condition "none (always)". The "network status" widget is not shown, based on determination that there is no network error. The "ECO status" widget is not shown, based on determination that there is not sufficient number of frames.

FIG. 12B illustrates a screen of scanner application GUI when the MFP 14a detects a network trouble. Since there is a network error detected, the "network status" widget with the priority rate of 3 is displayed, in alternative to the "application status" widget with the priority rate of 5.

Figure 13:
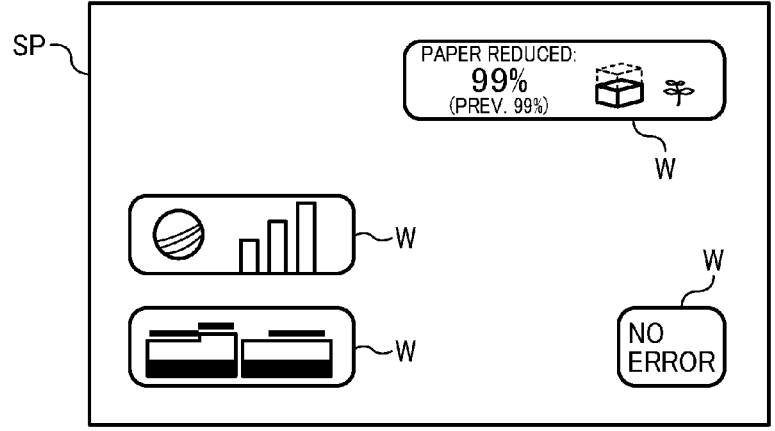
FIG. 13 is an illustration for explaining example GUI for printer application.

FIG. 13 is an example screen of printer application GUI, when the MFP 14a normally operates. Referring back to FIG. 8C, the "ECO status" widget is displayed on a first window. The "timer" widget is not displayed, based on determination that there is not sufficient number of frames for the remaining windows. The "toner remained" widget is not displayed based on determination that there is no toner end status. The "network status" widget is displayed on a second window. The "peripheral device management" widget is displayed on a third window. The "application status" widget is displayed on a fourth window.

As described above, the display controller 111 is able to automatically control appearances of the widget GUI according to settings data specific to each application that is currently in use. Further, the display controller 111 is able to automatically control appearances of the widget GUI according to various conditions of the subject for display control, such as the operation state of the MFP 14a, the application status, or the network status. The display controller 111 can generate a widget GUI, according to the application in use and the environments on which the application currently operates, without human intervention or without requiring time to design an application-specific GUI.

More specifically, the display controller 111 can automatically select one or more components to be displayed onto an application GUI, such as one or more widgets to be displayed on or together with the application GUI. As illustrated in FIGS. 11 and 12, each widget is previously set with a specific display condition for displaying that widget. For example, only when there is a trouble such as a trouble in peripheral device or a network trouble, the display controller 111 may cause the display 119 to dynamically change the display contents of the application GUI.

Figure 14:
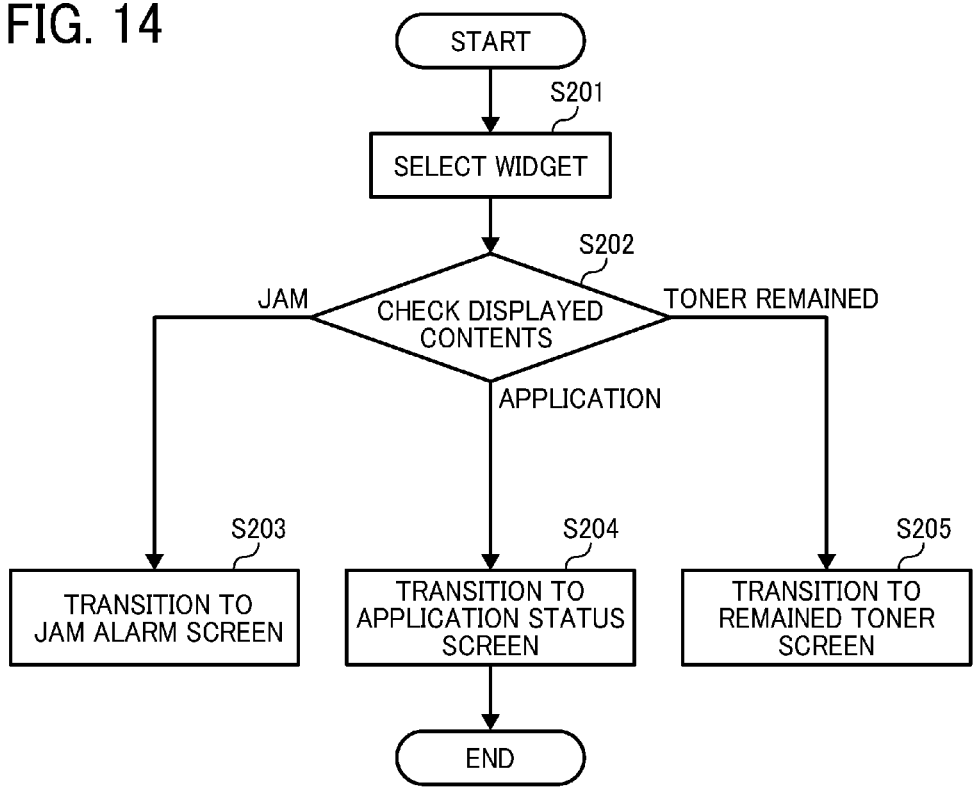
FIG. 14 is a flowchart illustrating operation of controlling display when a widget is selected, performed by the electronic apparatus, according to an example embodiment of the present invention.

Referring now to FIG. 14, operation of controlling display of information, performed by the electronic apparatus 100 when any one of the widgets displayed on or together with the application GUI in FIGS. 11 to 13 is selected, is explained according to an example embodiment of the present invention. For example, the user may select the widget icon by tapping with a finger or clicking with an input device.

At S201, the display controller 111 receives a user selection that selects one of the widgets.

At S202, the display controller 111 checks the displayed contents of the selected widget, and identifies a screen to be displayed next. For example, it is assumed that the widget GUI for copy application displays the "peripheral device management" widget indicating paper jam, the "application status" widget, and the "toner remained" widget. When the "peripheral device management" widget is selected, the display controller 111 checks the display condition "jam" of the "peripheral device management" widget, and transition to a detailed screen that gives instructions to remove paper based on the "operation when touched" information. When the "application status" widget is selected, the display controller 111 checks the display condition, and transition to a detailed screen that gives detailed information regarding the application status based on the "operation when touched" information. When the "toner remained" widget is selected, the display controller 111 checks the display condition, and transition to a specified URL indicating the remained amount of toner based on the "operation when touched" information.

In this manner, the display controller 111 switches, from the application GUI screen, to a detailed screen that provides further information regarding the selected widget more smoothly, thus allowing the user to instantly obtain information regarding the widget selected by the user.

As described above, the electronic apparatus 100 is capable of dynamically changing the settings of widget GUI such as the widgets to be displayed, depending on current operation of the electronic apparatus 100 such as an application in use or an operation state of a device that operates under control of the application in use. Further, the settings of application GUI may be dynamically changed, which may be displayed together with the widget GUI.

Figure 15:
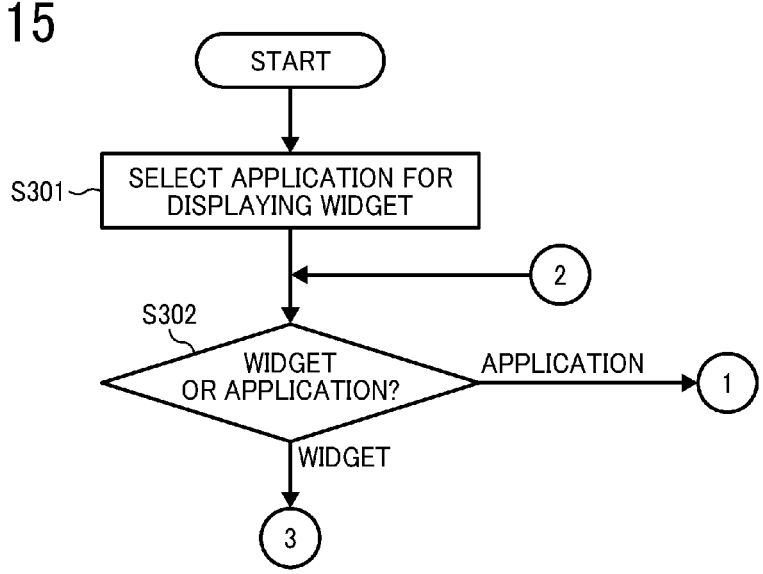
FIGS. 15, 16, 17A, and 17B are a flowchart illustrating operation of setting application GUI, performed by the electronic apparatus, according to an example embodiment of the present invention.
Figure 16:
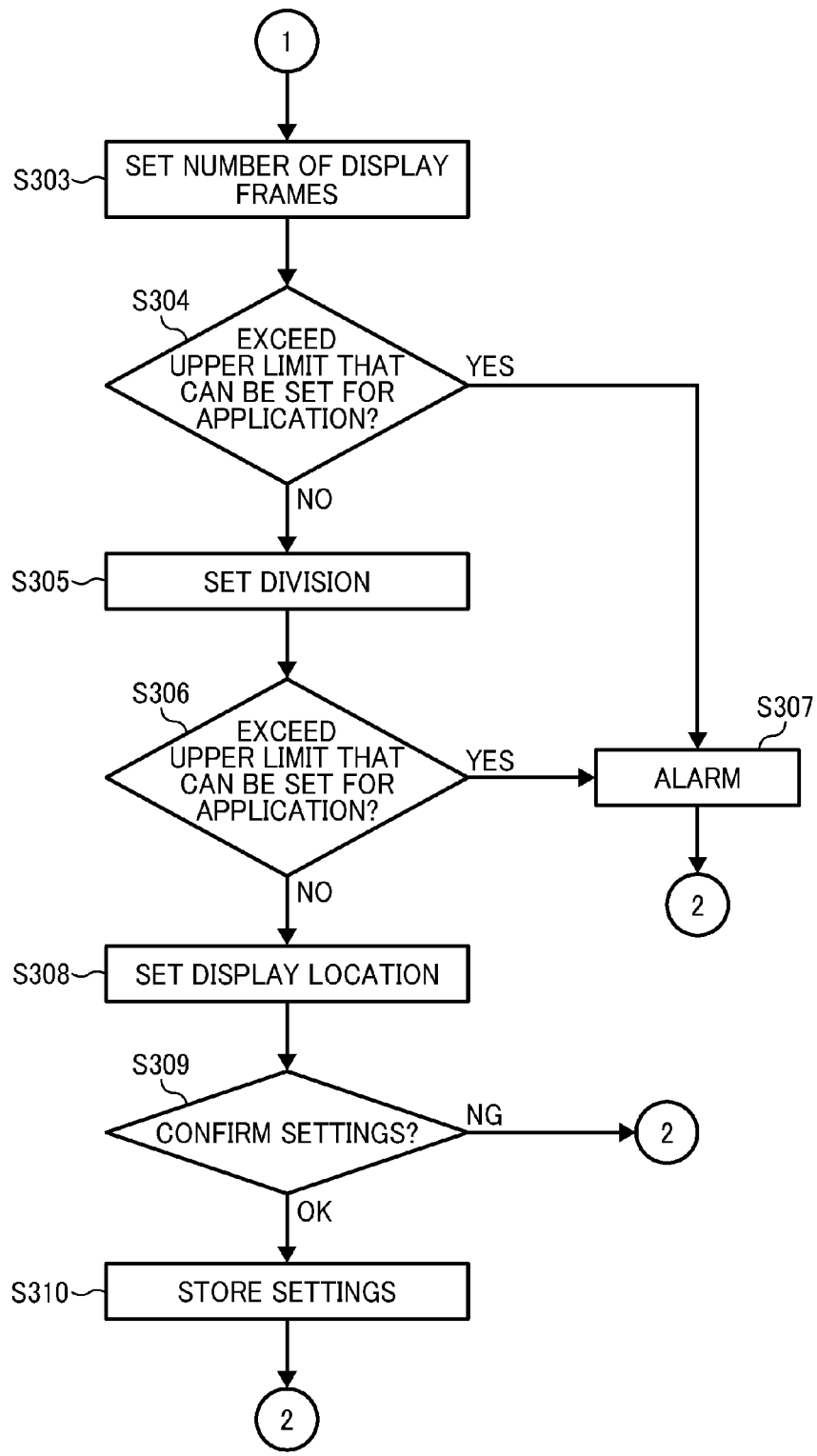

FIGS. 15 to 17 are a flowchart illustrating operation of editing the settings of application GUI or widget GUI, performed by the application GUI settings data editor 113, according to an example embodiment of the present invention. FIG. 18 illustrates transition of settings screens.

At S301, the application GUI settings data editor 113 causes the display 119 to display a widget settings top menu of FIG. 18, when a user instruction for starting settings operation is received, for example, through the panel 102. The application GUI settings data editor 113 receives a user input that selects application that the user desires to set. In this example, it is assumed that the user selects copy application from the widget settings top menu. In response to the user selection, the application GUI settings data editor 113 changes the screen from the widget settings top menu to a copy settings menu.

At S302, the application GUI settings data editor 113 receives a user instruction that selects either application or widget, through the copy settings menu that displays the application icon and the widget icon as illustrated in FIG. 18.

When the user selection that selects application is received, the operation proceeds to S303 of FIG. 16. At S303, the application GUI settings data editor 113 requests the user to set a number of frames "Napp" to be displayed on a screen of application GUI, for example, by displaying the "set frame number" screen as illustrated in FIG. 18. The user inputs a numeral, for example, using the input device.

When the user input is detected, at S304, the application GUI settings data editor 113 determines whether the number of frames that is input by the user exceeds an upper limit that is previously set for application subject for editing. When it is determined that the input number exceeds the upper limit ("YES" at S304), the operation proceeds to S307 to display a warning message to the user, for example, with information indicating the upper limit. With this message, the user is able to set a number of frames that is equal to or below the upper limit.

When it is determined that the input number does not exceed the upper limit ("NO" at S304), the application GUI settings data editor 113 may store the input number of frames in a memory at least temporarily, and the operation proceeds to S305.

At S305, the application GUI settings data editor 113 requests the user to set a number of divisions of the frames to be displayed onto the application GUI screen, for example, by displaying the "set division number" screen as illustrated in FIG. 18. The user inputs a numeral, for example, using the input device.

When the user input is detected, at S306, the application GUI settings data editor 113 determines whether the number of division of frames that is input by the user exceeds an upper limit that is previously set for application subject for editing. When it is determined that the input number exceeds the upper limit ("YES" at S306), the operation proceeds to S307 to display a warning message to the user, for example, with information indicating the upper limit. With this message, the user is able to set a number of frames that is equal to or below the upper limit.

When it is determined that the input number does not exceed the upper limit ("NO" at S306), the application GUI settings data editor 113 may store the input number of division of frames in a memory at least temporarily, and the operation proceeds to S308.

At S308, the application GUI settings data editor 113 requests the user to set a location of one or more widgets to be displayed onto the application GUI screen, for example, by displaying the "set layout" screen as illustrated in FIG.

18. The application GUI settings data editor 113 refers to the number of frames that is set at S303, and the number of divisions that is set at S305, to obtain information regarding the number of widget windows to be displayed onto the application GUI. Using the default layout that may be previously set, the application GUI settings data editor 113 displays the widget windows on the application GUI screen. For example, as illustrated in FIG. 18, the number of frames is set to 8, and the number of divisions is set to 4, for copy application. Based on the default layout, the application GUI settings data editor 113 displays the layout of a window with 3 frames at the upper right, a window with 2 frames at the lower left, a window with 2 frames at the lower left, and a window with 1 frame at the lower right. By using the input device such as a pointer, or a finger, the user is able to move each window that is supposed to display one or more frames of widget, through the screen, to determine the specific layout of the widget window. The user may select the "OK" key that may be displayed on the screen to send information regarding the layout.

At S309, the application GUI settings data editor 113 may confirm the display settings of the widgets, for example, by requesting the user to return the "OK" key. When it is confirmed, the operation proceeds to S310 to store information regarding the display settings of the widgets for application subjected for editing, in a memory. More specifically, the information to be stored includes information regarding the total number of frames to be displayed on the application GUI, the number of divisions of the frames, and the layout of the frames. This information may be referred to by the display controller 111 when determining one or more widgets to be displayed together with the application GUI.

Figure 17A:
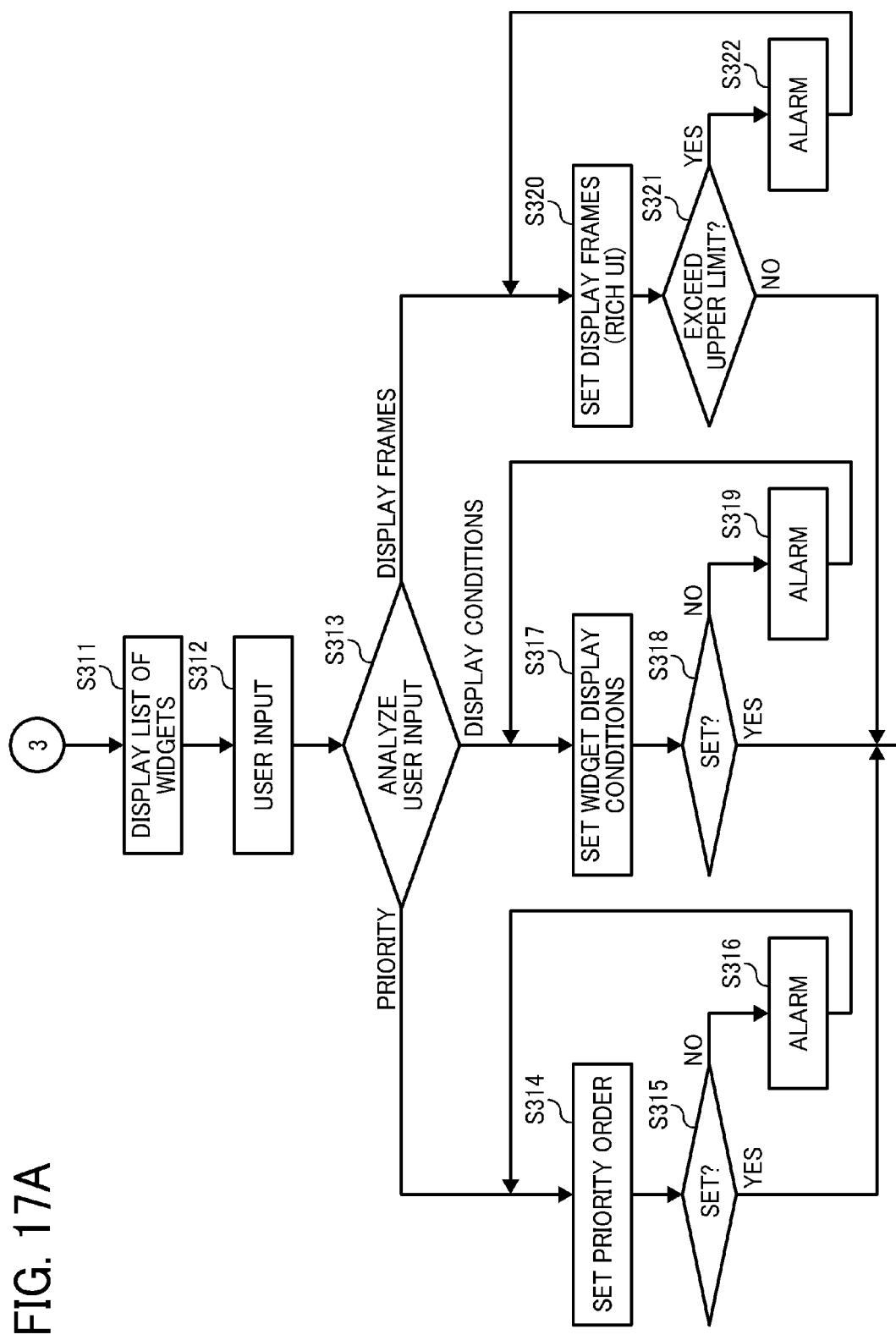

Referring back to S302, when the user selection that selects widget is received, the operation proceeds to S311 of FIG. 17A. At S311, the application GUI settings data editor 113 displays a list of widgets that can be set for application subject for editing. For example, the application GUI settings data editor 113 refers to the application GUI settings data management table 1121 of FIG. 8 to generate a list of widgets associated with a specific application. In this example of copy application, the application GUI settings data editor 113 refers to the copy application GUI settings management table of FIG. 8A to display a list of widgets available for copy application onto the "copy widget settings" screen of FIG. 18.

At S312, the application GUI settings data editor 113 receives a user input that selects one of the items being displayed and inputs a numeral to the selected item. For example, when the user selects the "priority order" cell for the "timer" widget by touching with a finger, the application GUI settings data editor 113 allows the user to select one of a plurality of numerals using a pull-down menu.

At S313, the application GUI settings data editor 113 analyzes the user input to determine processing to be performed. For example, when the user input selects the "priority order" cell for any one of the widgets, the operation proceeds to S314. When the user input selects the "display conditions" cell for any one of the widgets, the operation proceeds to S317. When the user input selects the "display frame" (number of display frames) cell for any one of the widgets, the operation proceeds to S320.

At S314, the application GUI settings data editor 113 obtains the priority order set by the user input. At S315, the application GUI settings data editor 113 determines whether the priority rate input by the user can be set for application subject for editing. When it can be set ("YES" at S315), the operation proceeds to S323 of FIG. 17B. When it cannot be set ("NO" at S315), the operation proceeds to S316 to request the user to input with a different priority rate.

At S317, the application GUI settings data editor 113 obtains the display condition set by the user input. At S318, the application GUI settings data editor 113 determines whether the display condition input by the user can be set for application subject for editing. For example, the application GUI settings data editor 113 may determine based on the available settings condition of FIG. 7B. When it can be set ("YES" at S318), the operation proceeds to S323 of FIG. 17B. When it cannot be set ("NO" at S318), the operation proceeds to S319 to request the user to input with a different display condition.

At S320, the application GUI settings data editor 113 obtains the number of frames set by the user input. At S321, the application GUI settings data editor 113 determines whether the number of frames input by the user exceeds the upper limit number of frames that is previously determined for application subject for editing. That is, the application GUI settings data editor 113 determines whether to set the displayed frames to "Rich UI", in which the number of frames be set greater than the normally set value. With the "Rich UI" settings, the widget icon is capable of displaying more information. When it does not exceed the upper limit ("NO" at S321), the operation proceeds to S323 of FIG. 17B. When it exceeds the upper limit ("YES" at S321), the operation proceeds to S322 to request the user to input with a different number of frames.

Figure 17B:
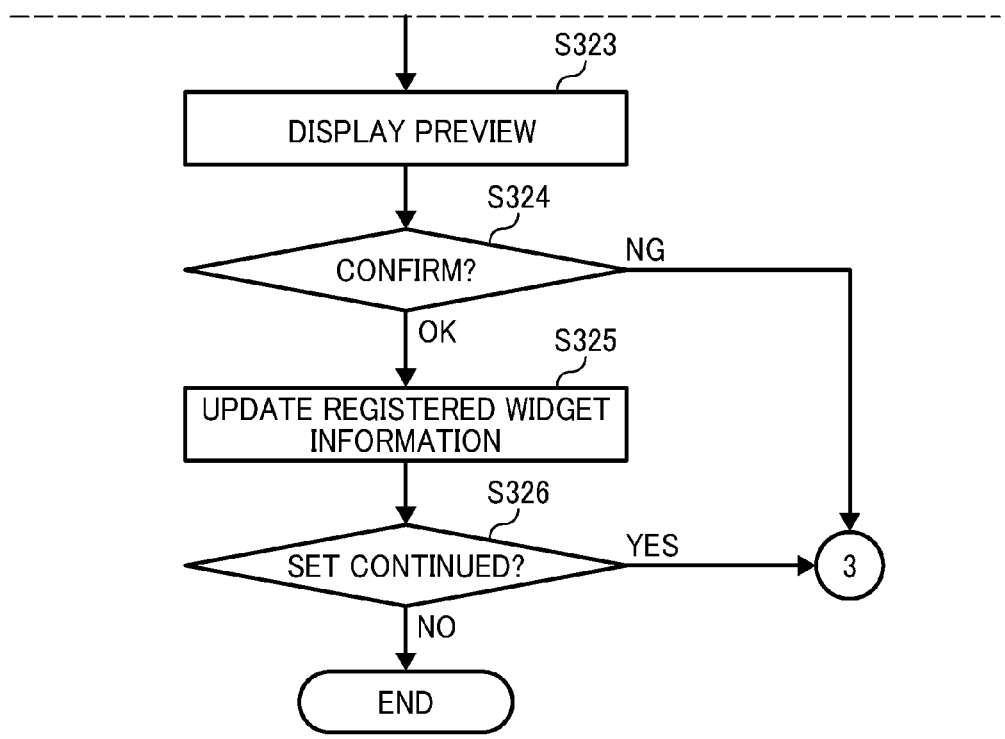
Figure 19A:
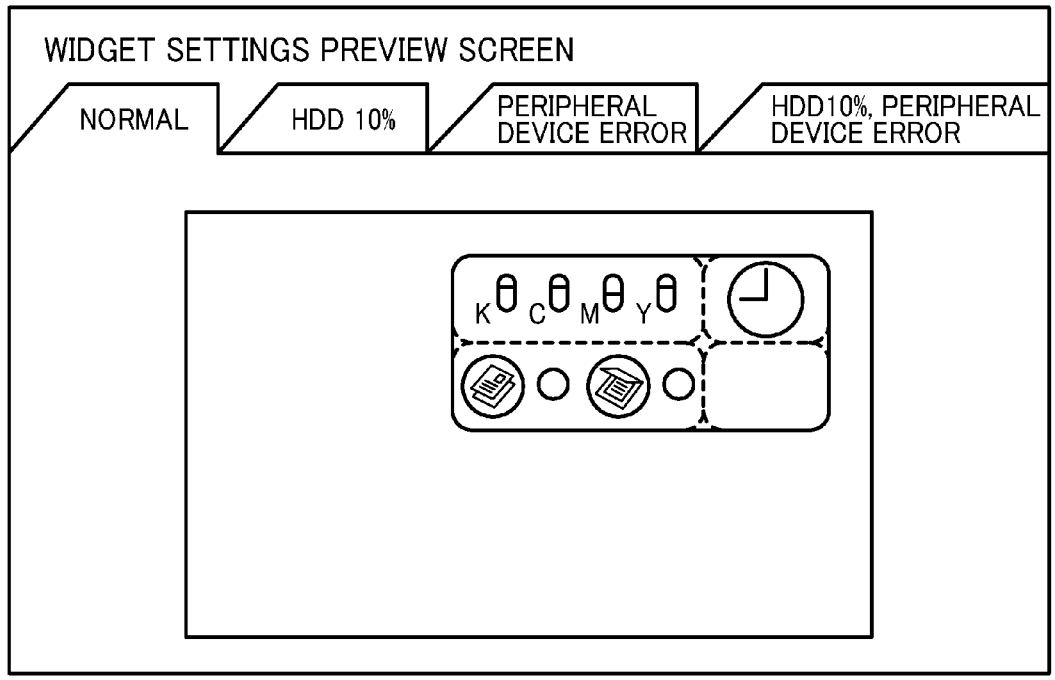
FIGS. 19A to 19D are an illustration for explaining preview screens, displayed when setting application GUI.
Figure 19B:
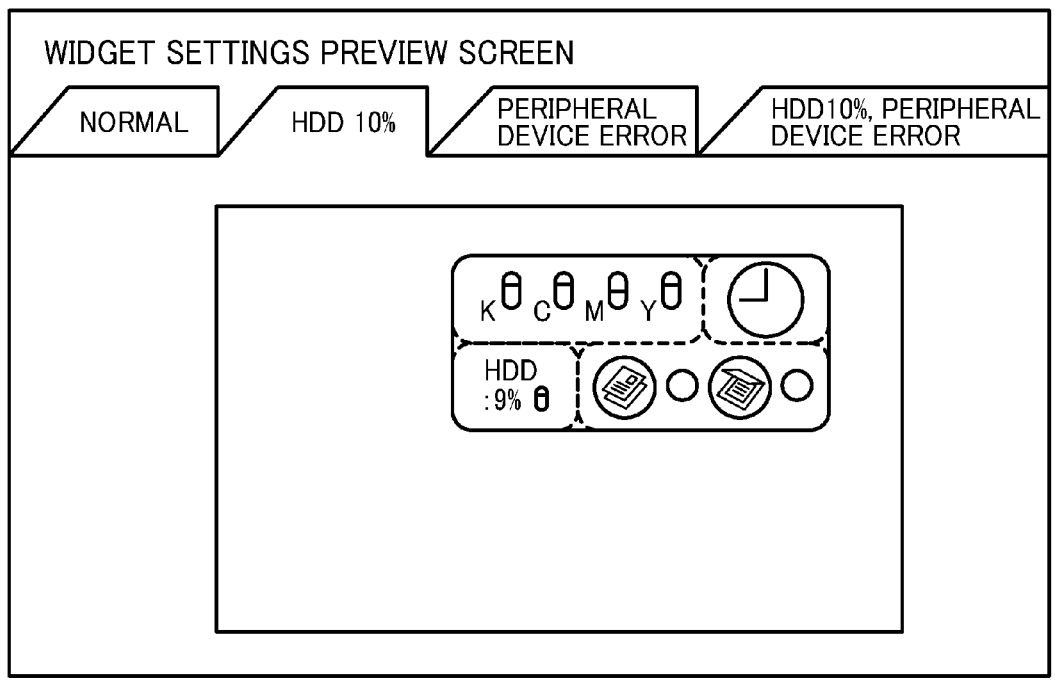
Figure 19C:
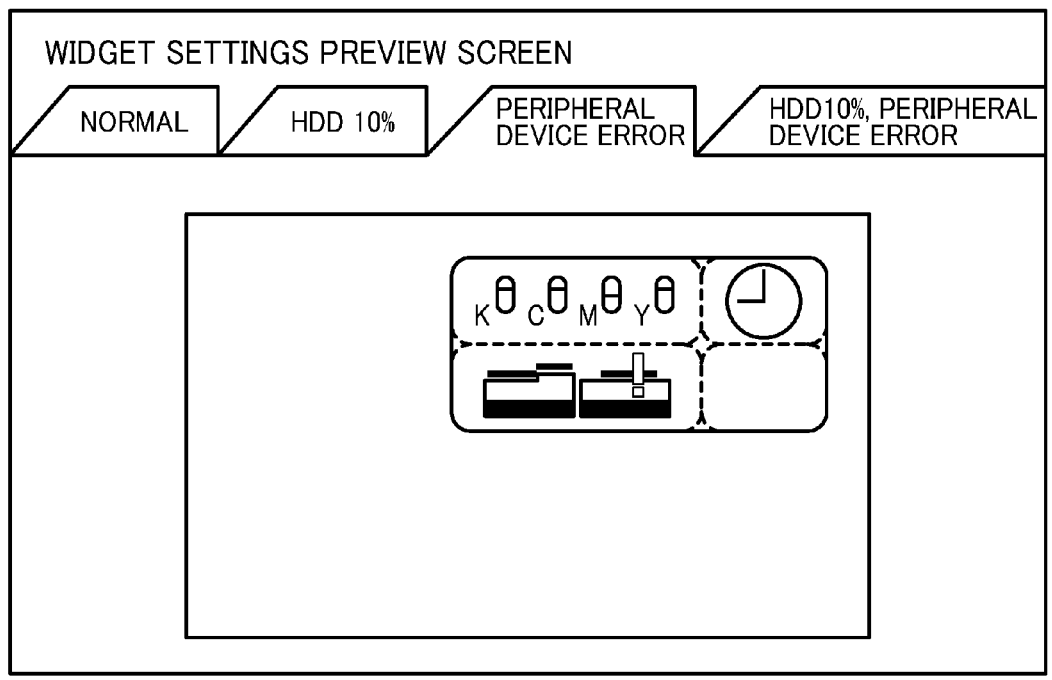
Figure 19D:
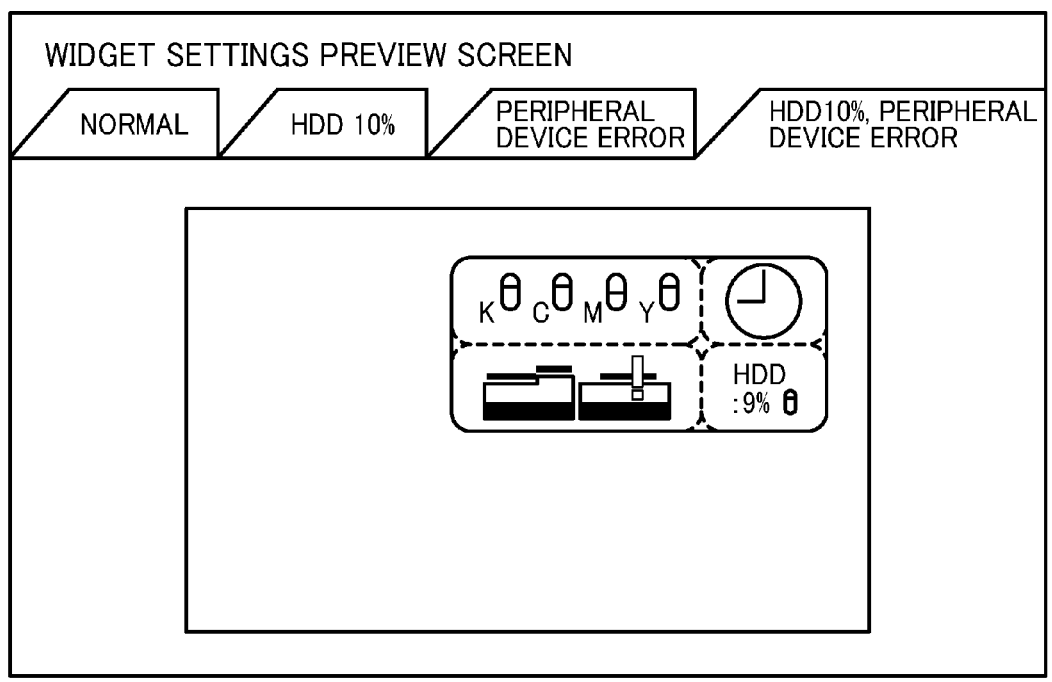

Referring to FIG. 17B, at S323, the application GUI settings data editor 113 causes the display 119 to display a preview image of application GUI that is just set. FIGS. 19A to 19D illustrate example preview images, which are respectively set for different display conditions. The screens of FIGS. 19A to 19D each display one preview image that displays the widgets that are determined to be displayed based on a specific display condition, while each tab indicating the specific display condition. More specifically, through selecting the tab indicating a specific display condition, the user can view a preview image corresponding to the specific display condition. FIG. 19A illustrates a preview image of copy application GUI, when the MFP 14a normally operates. FIG. 19B illustrates a preview image of copy application GUI, when the remained HDD memory space is equal to or less than 10%. FIG. 19C illustrates a preview image of copy application GUI, when an error is detected in the peripheral device. FIG. 19D illustrates a preview image of copy application GUI, when the remained HDD memory space is equal to or less than 10%, and an error is detected in the peripheral device.

At S324, the application GUI settings data editor 113 requests the user to confirm the preview images, for example, by requesting the user to select "OK" or "NG (not good)". When the preview images are confirmed ("OK" at S324), the operation proceeds to S325. When the preview images are not confirmed ("NG" at S324), the operation returns to S311.

At S325, the application GUI settings data editor 113 updates information regarding the widget GUI, which is previously registered in the application GUI settings data memory 112, with the confirmed information. At S326, the application GUI settings data editor 113 requests the user to select either to continue settings operation or not. When it is determined that the user input indicates to continue ("YES" at S326), the operation returns to S311. When it is determined that the user input indicates not to continue ("NO" at S326), the operation ends.

As described above, settings information that is used to determine one or more components to be displayed together with a specific application GUI, such as one or more widgets to be displayed together with a specific application GUI, can be freely modified according to the user preference.

Further, in this example, the panel controller 101 includes the widget additional interface 115. The widget additional interface 115 installs an additional widget to the system of electronic apparatus 100. For example, the widget additional interface 115 reads out a new widget from another system via the network or a removable memory, onto the widget memory 114. More specifically, the widget management table 1141 stores various information for the newly added widget, such as the number of display frames needed for displaying the widget icon, the display condition, the available application, the operation when touched, the display icon, etc. With the widget additional interface 115, the electronic apparatus 100 is able to use widgets, in addition to widgets that are set by default.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program. For example, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or nonvolatile memory. The HDD may be implemented by any desired kind of nonvolatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in an electronic apparatus accessible to a plurality of application programs. The electronic apparatus includes: a memory that stores a plurality of display components to be displayed together with an application user interface of at least one of the application programs; a manager that manages, for each of the plurality of application programs, a display area size required for displaying the display component, a priority order in displaying the display component, and a display condition of the display component, in association with one another; and a display controller that arranges one or more display components each satisfying the display condition in an order defined by the priority order until a total area size of the one or more display components reaches a display area size of the application screen, and causes a display to display the arranged one or more display components.

In one example, the electronic apparatus further includes a obtainer that obtains a state of an information processing apparatus connected to the electronic apparatus, and the display condition relates to the state of the information processing apparatus. The display controller determines whether the display condition is satisfied, based on the state of the information processing apparatus.

In one example, in response to selection of a display component being displayed, the display controller switches a display of the display to a screen corresponding to the selected display component.

In one example, the electronic apparatus further includes a display component additional interface that adds a new display component to the memory.

What is claimed is:

1. An electronic apparatus comprising:
a memory configured to store a plurality of display components each of which has been registered in association with at least one of a plurality of application programs, wherein each of the plurality of application programs corresponding to a particular type of application; and
a processor configured to,
manage, for each of the plurality of application programs, settings information regarding at least one of the plurality of display components associated with the particular type of application, the settings information including,
display size information indicating an area required for displaying each of the at least one of the plurality of display components based on the particular type of application,
priority order information indicating a priority order in displaying each of the at least one of the plurality of display components based on the particular type of application, and display condition information indicating a display condition under which each of the at least one of the plurality of display components is displayed based on the particular type of application, the display condition being a modifiable parameter that is selected from among a plurality of display conditions available on a display of the electronic apparatus for each of the at least one of the plurality of display components;

identify one of the plurality of application programs that is currently in operation to display an application user interface;

determine whether the at least one of the plurality of display components is to be displayed together with the application user interface for the identified application program based on the display size information, the priority order information, and the display condition information; and display the at least one of the plurality of display components if the determining determines that the at least one of the plurality of display components is to be displayed, together with the application user interface for the identified application program.

2. The electronic apparatus of claim 1, wherein the processor is further configured to, obtain information that reflects environments on which the identified application currently operates, and determine that the at least one of the plurality of display components is to be displayed together with the application user interface for the identified application program, when a display condition indicated by the obtained information that reflects the environments satisfies the display condition indicated by the display condition information of the at least one of the plurality of display components, wherein the at least one of the plurality of display components that is determined to be displayed is arranged in an order defined by the priority order information.

3. The electronic apparatus of claim 2, wherein the obtained information that reflects the environments includes state information indicating a current state of the identified application program or a current state of at least one device configured to perform an operation under control of the identified application program.

4. The electronic apparatus of claim 3, wherein the electronic apparatus is configured to obtain the state information from an image processing apparatus through a network, the state information indicating a current state of the identified application program stored in the image processing apparatus or a current state of at least one device in the image processing apparatus configured to perform an operation under control of the identified application program.

5. The electronic apparatus of claim 2, wherein the processor is further configured to, obtain application user interface size information indicating an area size of the application user interface for the identified application program, and determine that the at least one of the plurality of display components is to be displayed together with the application user interface for the identified application program, when an area required for displaying the at least one of the plurality of display components indicated by the display size information is equal to or less than a remained area size of the application user interface, wherein the at least one of the plurality of display components that is determined to be displayed is arranged in an order defined by the priority order information.

6. The electronic apparatus of claim 5, wherein, when the application user interface is divided into a plurality of display areas, the application user interface size information further indicates an area size of each one of the plurality of display areas of the application user interface for the identified application program, and the processor is further configured to determine that the at least one of the plurality of display components is to be displayed together with the application user interface for the identified application program, when an area required for displaying the at least one of the plurality of display components indicated by the display size information is equal to or less than a remained area size of one of the plurality of display areas of the application user interface, wherein the at least one of the plurality of display components that is determined to be displayed is arranged in an order defined by the priority order information.

7. The electronic apparatus of claim 1, wherein the processor is configured to, receive a user input for selecting one of the at least one of the plurality of display components being displayed, and switch the application user interface to a display previously associated with the selected display component.

8. The electronic apparatus of claim 1, wherein the processor is further configured to display the at least one of the plurality of display components on an interface that allows a user to modify the settings information.

9. The electronic apparatus of claim 1, wherein the processor is further configured to add a new display component to the memory, according to the user preference.

10. The electronic apparatus of claim 1, wherein the processor is further configured to generate the application user interface so as to include the at least one of the plurality of display components that is determined to be displayed as a part of the application user interface.

11. The electronic apparatus of claim 1, wherein the display component is a widget.

12. A display control method, comprising:

storing, in a memory, a plurality of display components each of which has been registered in association with at least one of a plurality of application programs, wherein each of the plurality of application programs corresponding to a particular type of application;

managing, for each of the plurality of application programs, settings information regarding at least one of the plurality of display components associated with the particular type of application, the settings information including, display size information indicating an area required for displaying each of the at least one of the plurality of display components based on the particular type of application, priority order information indicating a priority order in displaying each of the at least one of the plurality of display components based on the particular type of application, and display condition information indicating a display condition under which each of the at least one of the plurality of display components is displayed based on the particular type of application, the display condition being a modifiable parameter that is selected from among a plurality of display conditions available on a display of the electronic apparatus for each of the at least one of the plurality of display components;

identifying one of the plurality of application programs that is currently in operation to display an application user interface;

determining whether the at least one of the plurality of display components is to be displayed together with the application user interface for the identified application program based on the display size information, the priority order information, and the display condition information; and displaying the at least one of the plurality of display components if the determining determines that the at least one of the plurality of display components is to be displayed, together with the application user interface for the identified application program.

13. The display control method of claim 12, further comprising:

obtaining information that reflects environments on which the identified application currently operates;

determining that the at least one of the plurality of display components is to be displayed together with the application user interface for the identified application program, when a display condition indicated by the obtained information that reflects the environments satisfies the display condition indicated by the display condition information of the at least one of the plurality of display components; and arranging the at least one of the plurality of display components that is determined to be displayed in an order defined by the priority order information for display.

14. The display control method of claim 13, further comprising:

obtaining state information indicating a current state of the identified application program or a current state of at least one device that performs operation under control of the identified application program, as the obtained information that reflects the environments.

15. The display control method of claim 13, further comprising:

obtaining application user interface size information indicating an area size of the application user interface for the identified application program;

determining that the at least one of the plurality of display components is to be displayed together with the application user interface for the identified application program, when an area required for displaying the at least one of the plurality of display components indicated by the display size information is equal to or less than a remained area size of the application user interface; and arranging the at least one of the plurality of display components that is determined to be displayed in an order defined by the priority order information for display.

16. The display control method of claim 15, wherein when the application user interface is divided into a plurality of display areas, the application user interface size information further indicates an area size of each one of the plurality of display areas of the application user interface for the identified application program, and the method further comprises:

determining that the at least one of the plurality of display components is to be displayed together with the application user interface for the identified application program, when an area required for displaying the at least one of the plurality of display components indicated by the display size information is equal to or less than a remained area size of one of the plurality of display areas of the application user interface; and arranging the at least one of the plurality of display components that is determined to be displayed in an order defined by the priority order information for display.

17. A non-transitory recording medium storing a plurality of computer-readable instructions which, when executed by a processor, cause the processor to perform a display control method comprising:

storing, in a memory, a plurality of display components each of which has been registered in association with at least one of a plurality of application programs, wherein each of the plurality of application programs corresponding to a particular type of application;

managing, for each of the plurality of application programs, settings information regarding at least one of the plurality of display components associated with the particular type of application, the settings information including, display size information indicating an area required for displaying each of the at least one of the plurality of display components based on the particular type of application, priority order information indicating a priority order in displaying each of the at least one of the plurality of display components based on the particular type of application, and display condition information indicating a display condition under which each of the at least one of the plurality of display components is displayed based on the particular type of application, the display condition being a modifiable parameter that is selected from among a plurality of display conditions available on a display of the electronic apparatus for each of the at least one of the plurality of display components;

identifying one of the plurality of application programs that is currently in operation to display an application user interface;

determining whether the at least one of the plurality of display components is to be displayed together with the application user interface for the identified application program based on the display size information, the priority order information, and the display condition information; and displaying the at least one of the plurality of display components if the determining determines that the at least one of the plurality of display components is to be displayed, together with the application user interface for the identified application program.

* * * * *